United States Patent [19]
Kato et al.

[11] Patent Number: 5,086,672
[45] Date of Patent: Feb. 11, 1992

[54] HYDRAULIC CONTROL APPARATUS FOR VEHICLE TRANSMISSION SYSTEM, INCORPORATING VALVES FOR REVERSE INHIBIT VALVE

[75] Inventors: Nobuyuki Kato, Toyota; Ryoji Habuchi, Miyoshi; Kunio Morisawa; Hiroshi Itoh, both of Toyota, all of Japan

[73] Assignee: Toyota Jidosha Kabushiki Kaisha, Toyota, Japan

[21] Appl. No.: 562,113

[22] Filed: Aug. 2, 1990

[30] Foreign Application Priority Data

Aug. 9, 1989 [JP] Japan .................. 1-206086
Aug. 9, 1989 [JP] Japan .................. 1-206087

[51] Int. Cl.⁵ ............................................. B60K 41/12
[52] U.S. Cl. ................................ 74/868; 74/866
[58] Field of Search ....................... 74/866–869; 364/424.1

[56] References Cited

U.S. PATENT DOCUMENTS

| 4,134,313 | 1/1979 | Ishikawa | 74/867 |
| 4,545,265 | 10/1985 | Abo et al. | 74/868 |
| 4,576,265 | 3/1986 | Kumura et al. | 192/0.055 |
| 4,584,909 | 4/1986 | Abo et al. | 74/868 |
| 4,616,530 | 10/1986 | Tanaka et al. | 74/860 X |
| 4,653,621 | 3/1987 | Oshiage | 192/0.032 |
| 4,744,269 | 5/1988 | Greene et al. | 74/868 |
| 4,853,858 | 8/1989 | Kumura | 74/866 X |
| 4,955,260 | 9/1990 | Oshidari | 74/868 |
| 4,967,621 | 11/1990 | Soga et al. | 74/867 |

FOREIGN PATENT DOCUMENTS 60-37446 2/1985 Japan .
64-49749 2/1989 Japan .

Primary Examiner—Dwight Diehl
Attorney, Agent, or Firm—Oblon, Spivak, McClelland, Maier & Neustadt

[57] ABSTRACT

A hydraulic control apparatus for a vehicle power transmission for transmitting power from an engine to a drive wheel a reversing mechanism having a reverse position established by a hydraulic actuator. The apparatus includes a reverse inhibit valve disposed in a hydraulic line leading to the hydraulic actuator and having a reverse inhibit position for inhibiting the mechanism from being placed in the reverse position and a non-inhibit position for permitting the mechanism to be placed in the reverse position. The apparatus uses a first and a second pilot pressure generating device for producing a first and a second pilot pressure, respectively. A relay valve is provided for producing a first hydraulic signal for establishing the reverse inhibit position of the reverse inhibit valve, based on one of combinations of operating states of the two pilot pressure generating devices, and a second hydraulic signal for establishing the non-inhibit position, based on the other combinations.

19 Claims, 14 Drawing Sheets

SECOND LINE PRESSURE $P_{l2}$

θth INCREASE

Pe

θth DECREASE

SPEED RATIO e

SECOND LINE PRESSURE $P_{l2}$

θth INCREASE

θth DECREASE

SPEED RATIO e

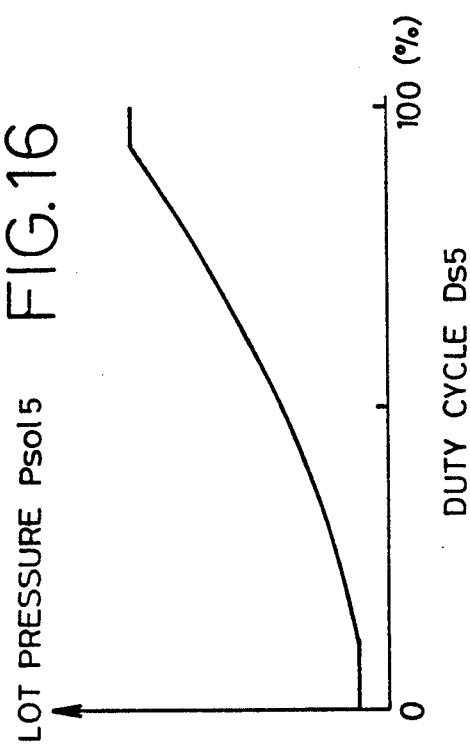
FIG.14
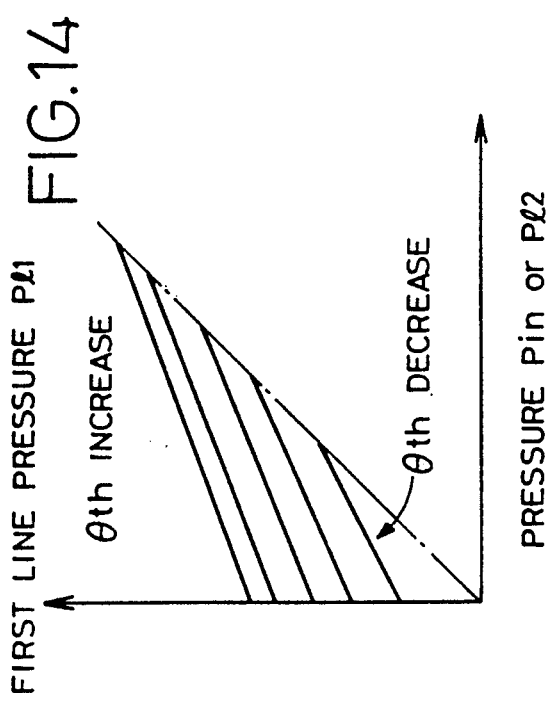
FIG.16
FIG.15
| THIRD SOLENOID VALVE 330 | FOURTH SOLENOID VALVE 346 | LOCK-UP CLUTCH 36 |
|---|---|---|
| OFF | OFF | 1ST RELEASE MODE |
| OFF | ON | RAPID RELEASE MODE |
| ON | OFF | ENGAGING MODE |
| ON | ON | 2ND RELEASE MODE |

FIG.19

| HYDRAULIC CONTROL MODE | 3RD SOLENOID VALVE 330 | 4TH SOLENOID VALVE 346 | 5TH SOLENOID VALVE 392 | LOCK-UP CLUTCH 36 | 2ND LINE PRESSURE Pℓ2 | CONTROL MODES |
|---|---|---|---|---|---|---|
| A | OFF | OFF | OFF | 1ST RELEASE MODE | NORMAL | |
| B | OFF | OFF | ON | 1ST RELEASE MODE | REDUCTION | Pℓ2 REDUCTION IN POSITION "N", AND REVERSE INHIBIT |
| C | ON | OFF | OFF | ENGAGING MODE | NORMAL | LOCK-UP CLUTCH ENGAGEMENT IN POSITION "D" |
| D | ON | OFF | ON | ENGAGING MODE | REDUCTION | Pℓ2 REDUCTION AT HIGH VEHICLE SPEED |
| E | OFF | ON | OFF | RAPID RELEASE MODE | NORMAL | LOCK-UP CLUTCH RAPID RELEASE |
| F | OFF | ON | ON (DUTY CYCLING) | RAPID RELEASE MODE | INCREASE | ACCUMULATOR BACK PRESSURE CONTROL UPON N-D AND N-R SHIFTING OPERATIONS |
| G | ON | ON | OFF | 2ND RELEASE MODE | NORMAL | LOCK-UP CLUTCH RELEASE IN POSITION "D" |
| H | ON | ON | ON | 2ND RELEASE MODE | INCREASE | Pℓ2 INCREASE UPON RAPID SHIFT-DOWN OF CVT |

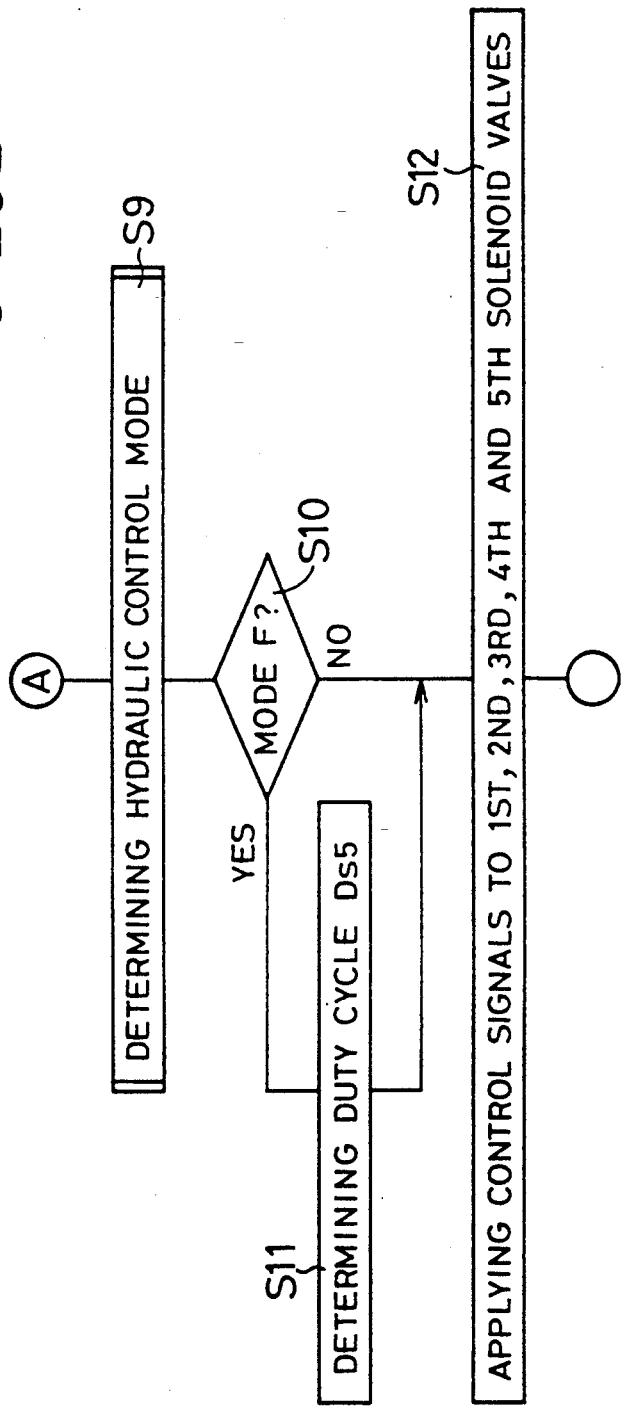

HYDRAULIC CONTROL APPARATUS FOR VEHICLE TRANSMISSION SYSTEM, INCORPORATING VALVES FOR REVERSE INHIBIT VALVE

BACKGROUND OF THE INVENTION

1. Field of the Invention

The present invention relates to a hydraulic control apparatus for controlling a hydraulically operated power transmitting system of a motor vehicle.

2. Discussion of the Prior Art

A known power transmitting system for a motor vehicle is adapted to transmit power from an engine to drive wheels of the vehicle, through a reversing gear mechanism hydraulically operated for establishing the reverse position for running the vehicle in the reverse position. For example, the power transmitting system uses a transmission having a reverse drive position as well as forward drive positions, or a continuously variable transmission equipped with a reversing device connected thereto. The power transmitting system of this type has a hydraulic circuit for applying a pressure to an appropriate hydraulic actuator for selecting or establishing the reverse position of the transmission or reversing device in response to an operation of a shift lever to the reverse position. An example of a hydraulic control device incorporating such a hydraulic circuit is disclosed in laid-open publication No. 64-49749 of unexamined Japanese Patent Application. If the shift lever is operated from a forward drive position to the reverse position through the neutral position during a forward running of the vehicle, the reversing gear mechanism is subject to an abrupt change in the load due to an automatic shifting action thereof to the reverse position, which may result in a considerable degree of shock to the power transmitting system, deteriorating the driving comfort of the vehicle.

In the light of the above drawback, the provision of a reverse inhibit valve in a hydraulic line leading to the hydraulic actuator for the reversing gear mechanism is proposed as disclosed in unexamined Japanese Patent Application No. 63-34598. For operating the reverse inhibit valve, solenoid-operated valve means is provided for generating a hydraulic signal or pilot pressure to be applied to the reverse inhibit valve, so that the reverse inhibit valve is operated to the reverse inhibit position for inhibiting the reversing gear mechanism from being placed in the reverse position if the shift lever is moved to the reverse position while the vehicle is running in the forward direction.

In a known hydraulic control arrangement for the power transmitting system using a reverse inhibit valve as indicated above, the solenoid-operated valve means generally uses a single solenoid-operated valve for producing a pilot pressure in response to an electric signal generated from an electronic control device. If this solenoid-operated valve fails to normally function due to sticking of its valve spool, for example, the reverse inhibit valve is kept in the reverse inhibit position and is prevented from being brought to the non-inhibit position. In this event, the reversing gear mechanism cannot be placed in the reverse position to move the vehicle in the reverse direction even while an electric signal is applied to the solenoid-operated valve to place the reversing gear mechanism in the reverse position.

In the meantime, the power transmitting system has two or more hydraulic control modes which are established by respective pilot pressure generating solenoid-operated valves operated according to electric signals from the electronic control device. If a relatively large number of the hydraulic control modes are available, an accordingly large number of pilot pressure generating solenoid-operated valves are required, causing the hydraulic control arrangement to be accordingly complicated and large-sized.

SUMMARY OF THE INVENTION

It is therefore an object of the present invention to provide a hydraulic control apparatus for controlling a hydraulically operated power transmitting system for a motor vehicle, which includes a reverse inhibit valve for inhibiting a reversing gear mechanism from being placed in its reverse position even with a shift lever is operated to the reverse position, and which permits the reverse inhibit valve to be placed in its non-inhibit position even in the event of a failure of control valve means for controlling the reverse inhibit valve.

A second object of the present is to provide such a hydraulic control apparatus which includes a reverse inhibit valve as indicated above and which utilizes a pilot pressure used for the reverse inhibit valve, for other purposes except when the shift lever is operated to the reverse position.

The above first object may be achieved according to the principle of the present invention, which provides a hydraulic control apparatus for controlling a hydraulically operated power transmitting system for a motor vehicle, wherein power is transmitted from an engine of the vehicle to a drive wheel of the vehicle through a reversing gear mechanism having a reverse position which is established by a hydraulic actuator in response to an operation of a shift lever, by applying a pressure to the actuator, the hydraulic control apparatus comprising: (a) a reverse inhibit valve disposed in a hydraulic line leading to the hydraulic actuator, and having a reverse inhibit position for inhibiting the reversing gear mechanism from being placed in the reverse position and a non-inhibit position for permitting the mechanism to be placed in the reverse position; (b) first pilot pressure generating means for producing a first pilot pressure; (c) second pilot pressure generating means for producing a second pilot pressure; and a relay valve for applying a first hydraulic signal to the reverse inhibit valve for placing the reverse inhibit valve in the reverse inhibit position, when on one of combinations of operating states of the first and second pilot pressure generating means is established, and for applying a second hydraulic signal to the reverse inhibit valve for placing the reverse inhibit valve in the non-inhibit position, when any one of the other of the combinations of operating states is established.

In the hydraulic control apparatus of the present invention constructed as described above, the relay valve produces the first hydraulic signal to place the reverse inhibit valve in the reverse inhibit position when one of the possible combinations of operating states of the first and second pilot pressure generating means is established, and produces the second hydraulic signal to place the reverse inhibit valve in the non-inhibit position when any one of the other combinations is established. For instance, the first hydraulic signal is produced by the relay valve when the first and second pilot pressure generating means are placed in OFF and ON positions, respectively, and the second hydraulic signal is produced when the first and second pilot pressure generating means are placed in ON and OFF positions, respectively. In this case, even if the combination of the ON and OFF positions of the first and second pilot pressure generating means for placing the reverse inhibit valve in the non-inhibit position cannot be established due to a failure of one of the two pilot pressure generating means, the second hydraulic signal can be produced by the relay valve when the first and second pilot pressure generating means are both placed in the OFF position, or both placed in the ON position. In the event of a failure of the first pilot pressure generating means, the first pilot pressure generating means remains in the OFF position even when it is commanded to be placed in the ON position, and the second pilot pressure generating means remains in the ON position even when it is commanded to be placed in the OFF position. Since the relay valve is adapted to produce the second hydraulic signal for establishing the non-inhibit position of the reverse inhibit valve when any one of the combinations of operating states of the first and second pilot pressure generating means other than the combination for producing the first hydraulic signal, the reverse inhibit valve may be placed in the non-inhibit position even if either one of the two pilot pressure generating means becomes defective, namely, unless both of these two means become defective.

The hydraulic control apparatus of the present invention is applicable to a hydraulically operated power transmitting system which includes a continuously variable transmission whose speed ratio is continuously variable, and a reversing device functioning as the reversing gear mechanism connected in series with the continuously variable transmission. In this case, the reversing device is operated by the hydraulic actuator to a forward position in response to an operation of the shift lever to a forward drive position, and to the reverse position in response to the operation of the shift lever to the reverse position.

The hydraulic control apparatus may include a shift lever valve which is operatively connected to the shift lever and is operable to apply a hydraulic pressure to a first hydraulic actuator to establish the forward position of the reversing device when the shift lever is operated to the forward drive position, and apply a hydraulic pressure to a second hydraulic actuator to establish the reverse position of the reversing device when the shift lever is operated to the reverse position. In this case, the reverse inhibit valve may be disposed in a hydraulic line between the shift lever valve and the second hydraulic actuator. For example, the reverse inhibit valve is constructed so as to have: a valve spool movable between the reverse inhibit position and the non-inhibit position; a chamber partially defined by one end of the valve spool and receiving one of the first and second hydraulic signals from the relay valve, to produce a thrust acting on the valve spool in a first direction toward the reverse inhibit position; a spring for biasing the valve spool in a second direction toward the non-inhibit position; a chamber partially defined by the other end of the valve spool and receiving a pressure in the second hydraulic actuator, to produce a thrust acting on the valve spool in the second direction; a plunger held in abutting contact with the other end of the valve spool and having a smaller diameter than the valve spool; and a chamber partially defined by one end of the plunger and receiving a pressure produced by the shift lever valve, to produce a thrust acting on the valve spool in the second direction. In the above arrangement, the valve spool is moved to the reverse inhibit position when the first hydraulic signal is applied to the chamber partially defined by the one end of the valve spool.

The relay valve may include a valve spool movable between a first and a second position by the first pilot pressure produced by the first pilot pressure generating means, such that the second pilot pressure produced by the second pilot pressure generating means is applied to the reverse inhibit valve as the first hydraulic signal when the valve spool of the relay valve is placed in the first position, and such that the second pilot pressure is blocked by the valve spool of the relay valve and an atmospheric pressure is applied to the reverse inhibit valve as the second hydraulic signal when the valve spool of the relay valve is placed in the second position.

The first and second pilot pressure generating means may be adapted such that each of these means includes a flow restrictor and a solenoid-operated valve connected to a pressure line through the flow restrictor, so that the first and second pilot pressure generating means produce the first and second pilot pressures by changing a pressure in the pressure line downstream of the flow restrictors, in response to opening and closing operations of the solenoid-operated valves, respectively. The hydraulic control apparatus may use an electronic control device which operates to determine whether the shift lever is operated to the reverse position while the vehicle is running in a forward direction, and command the solenoid-operated valves of the first and second pilot pressure generating means, so that the relay valve produces the first hydraulic signal to place the reverse inhibit valve in the reverse inhibit position when the electronic control device determines that the shift lever is operated to the reverse position while the vehicle is running in the forward direction.

The second object indicated above may be achieved according to another aspect of the present invention, which provides a hydraulic control apparatus for controlling a hydraulically operated power transmitting system for a motor vehicle, wherein power is transmitted from an engine of the vehicle to a drive wheel of the vehicle through a reversing gear mechanism having a reverse position which is established by a hydraulic actuator in response to an operation of a shift lever to a reverse position, the hydraulic control apparatus comprising: (a) a shift lever valve operatively connected to the shift lever and operable to apply a hydraulic pressure to the hydraulic actuator to establish the reverse position of the reversing gear mechanism when the shift lever is operated to the reverse position; (b) hydraulic signal generating means for producing a hydraulic signal for inhibiting the reversing gear mechanism from being placed in the reverse position while the vehicle is running in a forward direction; and (c) a reverse inhibit valve disposed in a hydraulic line leading to the hydraulic actuator. The reverse inhibit valve is operated to a reverse inhibit position for inhibiting the reversing gear mechanism from being placed in the reverse position when the hydraulic pressure and the hydraulic signal are both concurrently applied to the reverse inhibit valve, and operated to a non-inhibit position for permitting the mechanism to be placed in the reverse position when at least one of the hydraulic pressure and the hydraulic signal is not applied to the reverse inhibit valve.

In the hydraulic control apparatus constructed as described above, the reverse inhibit valve is switched to the reverse inhibit position only when the hydraulic signal produced by the hydraulic signal generating means and the hydraulic pressure produced by the shift lever valve are both concurrently applied to the reverse inhibit valve. This arrangement permits the hydraulic signal of the hydraulic signal generating means to be used for the other purposes, for example, for establishing a desired hydraulic control mode other than the reverse inhibit mode. Accordingly, the hydraulic circuit arrangement may be simplified.

Further, the above arrangement prevents the establishment of the reverse inhibit position of the reverse inhibit valve even if the hydraulic signal is applied to the reverse inhibit valve due to a trouble of the hydraulic pressure generating means, unless the hydraulic signal produced by the shift lever valve is also applied to the reverse inhibit valve.

The present hydraulic control apparatus is also applicable to the hydraulically operated power transmitting system which includes a continuously variable transmission and a reversing device, as described above.

The reverse inhibit valve may have: a spool movable between the reverse inhibit position and the non-inhibit position; a chamber partially defined by one end of the valve spool and receiving the hydraulic signal from the hydraulic signal generating means, to produce a first thrust acting on the valve spool in a first direction toward the reverse inhibit position; and a chamber partially defined by the valve spool and receiving the hydraulic pressure from the shift lever valve, to produce a second thrust acting on the valve spool in the first direction. The valve spool is moved to the reverse inhibit position when both of the first and second thrusts act on the valve spool. In this instance, the reverse inhibit valve may further have a spring for biasing the valve spool in a second direction toward the non-inhibit position, a chamber partially defined by the valve spool and receiving a pressure in the hydraulic actuator, to produce a third thrust acting on the valve spool in the second direction, a plunger held in abutting contact with the other end of the valve spool and having a smaller diameter than the valve spool, and a chamber partially defined by one end of the plunger and receiving the pressure produced by the shift lever valve, to produce a fourth thrust acting on the valve spool in the second direction. According to this arrangement, the valve spool is moved to the reverse inhibit position when a sum of the first and second thrusts exceeds a sum of the third and fourth thrusts.

The hydraulic signal generating means may include the first and second pilot pressure generating means and the relay valve, as described above with respect to the first aspect of the present invention.

BRIEF DESCRIPTION OF THE DRAWINGS

The above and optional objects, features and advantages of the present invention will become more apparent by reading the following detailed description of a presently preferred embodiment of the present invention, when considered in conjunction with the accompanying drawings, in which:

FIG. 14 is a graph indicating an output characteristic of the first pressure regulating valve of FIG. 4, i.e., a relationship between a first line pressure and a second line pressure or a pressure in a first hydraulic cylinder of the CVT;

FIG. 15 is a view indicating modes of operation of a lock-up clutch corresponding to different combinations of operating states of a third and a fourth solenoid valve of the apparatus of FIG. 2;

FIG. 16 is a graph indicating a relationship between the duty cycle of a fifth solenoid valve of the apparatus of FIG. 2 and a pilot pressure continuously changed with the duty cycle;

FIG. 19 is a view indicating a relationship between hydraulic control modes of the apparatus of FIGS. 2 and different combinations of third, fourth and fifth solenoid valves; and FIGS. 20A and 20B are a flow chart illustrating an operation of the hydraulic control apparatus of FIG. 1.

DETAILED DESCRIPTION OF THE PREFERRED EMBODIMENT

Figure 1:
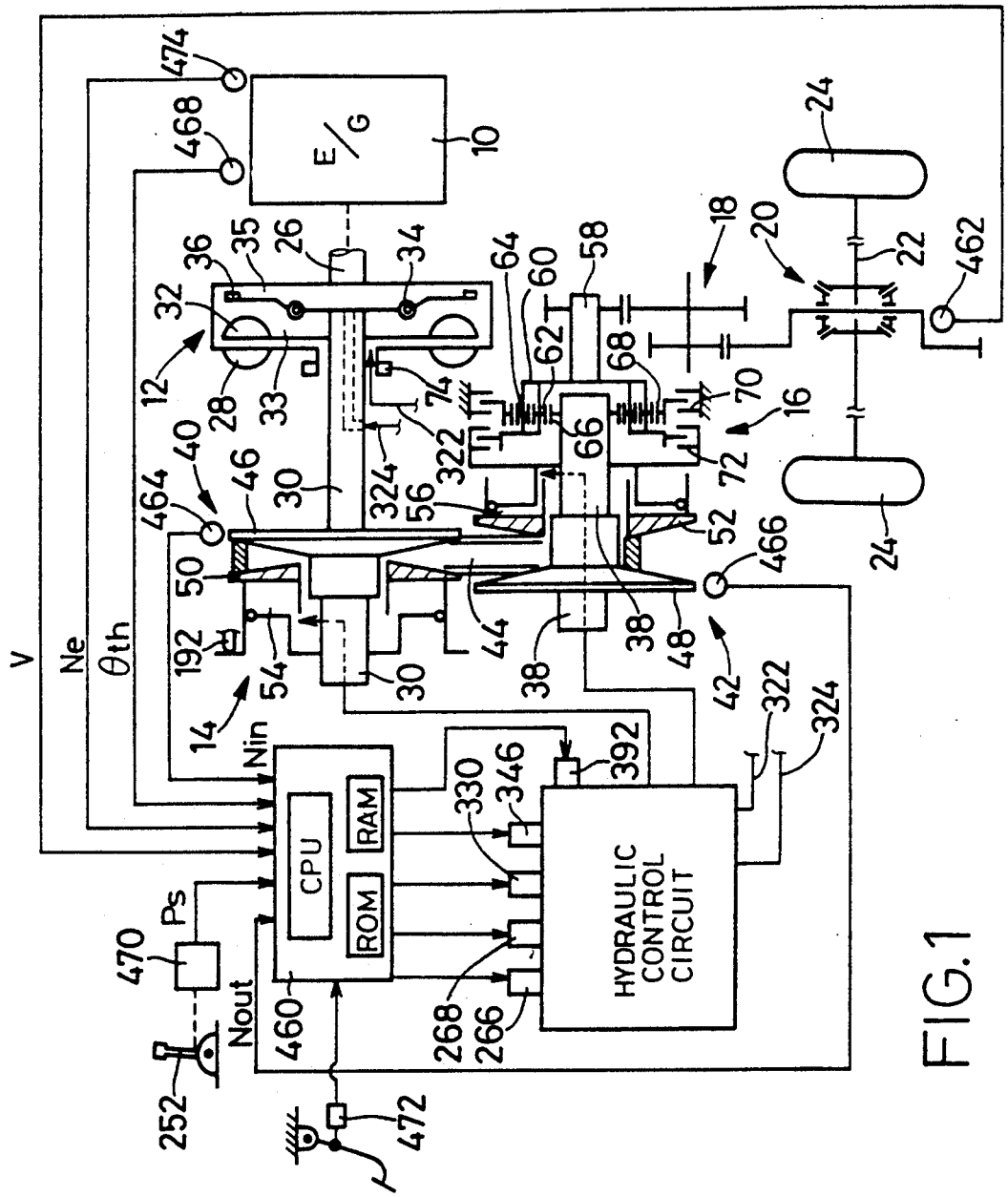
FIG. 1 is a schematic view of a vehicle power transmitting system equipped with a hydraulic control apparatus constructed according to one embodiment of the present invention.

Referring first to FIG. 1, there is illustrated a power transmitting system of an automotive vehicle, for transmitting power from an engine 10 to drive wheels 24, 24. The power transmitting system includes: a fluid coupling 12 connected to the engine 10 through a crankshaft 26 and equipped with a lock-up clutch 36; a continuously variable transmission (hereinafter referred to as "CVT") 14 connected to the fluid coupling 12; a reversing gear mechanism in the form of a reversing device 16 connected to the CVT 14, for selecting a forward or a reverse running of the vehicle; an intermediate gear device 18 connected to the reversing device 16; a differential gear device 20 connected to the intermediate gear device 18; and a drive axle 22 connected to the differential gear device 20 and drive wheels 24.

The fluid coupling 12 includes a pump impeller 28 connected to the crankshaft 26 of the engine 10; a turbine impeller 32 which is fixed to an input shaft 30 of the CVT 14 and rotated by means of a working fluid from the pump impeller 28; the lock-up clutch 36 indicated above, which is fixed to the input shaft 30 through a damper 34; and means for defining an engaging chamber 33 communicating with an engaging line 322 (which will be described), and a releasing chamber 35 communicating with a releasing line 324 (which will be described). The fluid coupling 12, which is filled with the working fluid, is operated to effect engagement of the lock-up clutch 36 for direct connection of the crankshaft 26 to the input shaft 30, when the speed of the vehicle, or a difference between the speeds of the pump and turbine impellers 28, 32, for example, exceeds a predetermined value. In this case, the fluid is fed into the engaging chamber 33 while the fluid in the releasing chamber 35 is discharged. When the vehicle speed or speed difference indicated above falls below the predetermined value, on the other hand, the lock-up clutch 36 is disengaged or released such that the fluid is fed into the releasing chamber 35 and discharged from the engaging chamber 33.

The CVT 14 has a pair of variable-diameter pulleys 40, 42 having a same diameter which are provided on the input shaft 30 and an output shaft 38, respectively. These pulleys 40, 42 are connected by a transmission belt 44, and have respective stationary rotors 46, 48 fixed to the respective input and output shafts 30, 38, and respective axially movable rotors 50, 52 which are axially movable on the respective shafts 30, 38 and rotated with these shafts. The movable rotors 50, 52 are moved by respective first and second hydraulic actuators in the form of first and second hydraulic cylinders 54, 56, whereby the effective widths of V grooves of the pulleys 40, 42, i.e., the effective diameters engaging the belt 44 are changed, to change a speed ratio "e" of the CVT 14 (Nout/Nin, where Nout=speed of the output shaft 38, and Nin=speed of the input shaft 30).

Since the variable-diameter pulleys 40, 42 have the same diameter, the corresponding first and second hydraulic cylinders 54, 56 have a same pressure-receiving area. Generally, the tension of the transmission belt 44 is determined primarily by the pressure in one (hereinafter referred to as "driven side cylinder") of the first and second hydraulic cylinders 54, 56 which corresponds to the driven one of the pulleys 40, 42 (hereinafter referred to as "driven side pulley"). The driven side cylinder 54 or 56 is supplied with a second line pressure Pl2 which is adjusted by a second pressure regulating valve 102 (which will be described), whereby the tension of the belt 44 is adjusted to within an optimum range in which the belt 44 does not slip on the pulleys 40, 42.

The reversing device 16 is a well known double-pinion type planetary gear mechanism, which includes: a carrier 60 fixed on an output shaft 58; a pair of planetary gears 62, 64 which are rotatably supported by the carrier 60 and which mesh with each other; a sun gear 66 which is fixed on the input shaft 38 (output shaft of the CVT 14) and which meshes with the inner planetary gear 62; a ring gear 68 meshing with the outer planetary gear 64; a REVERSE brake 70 for stopping the rotation of the ring gear 68; and a FORWARD clutch 72 for connecting the carrier 60 and the input shaft 38.

The REVERSE brake 70 and FORWARD clutch 72 are hydraulically operated, frictionally coupling devices. The reversing device 16 is placed in a neutral position thereof when the brake 70 and the clutch 72 are both in the disengaged or released positions. In this state, the reversing device 16 does not transmit power to the intermediate gear device 18. When the FORWARD clutch 72 is engaged, the output shaft 38 (input shaft of the device 16) of the CVT 14 and the output shaft 58 of the device 16 are connected to each other, whereby power is transmitted from the CVT 14 to the intermediate gear device 18, so as to run the vehicle in the forward direction. When the REVERSE brake 70 is engaged, on the other hand, the direction of rotation of the output shaft 58 of the reversing device 16 is reversed with respect to the direction of rotation of the output shaft 38 of the CVT 14, whereby power is transmitted so as to run the vehicle in the reverse direction.

Figure 2:
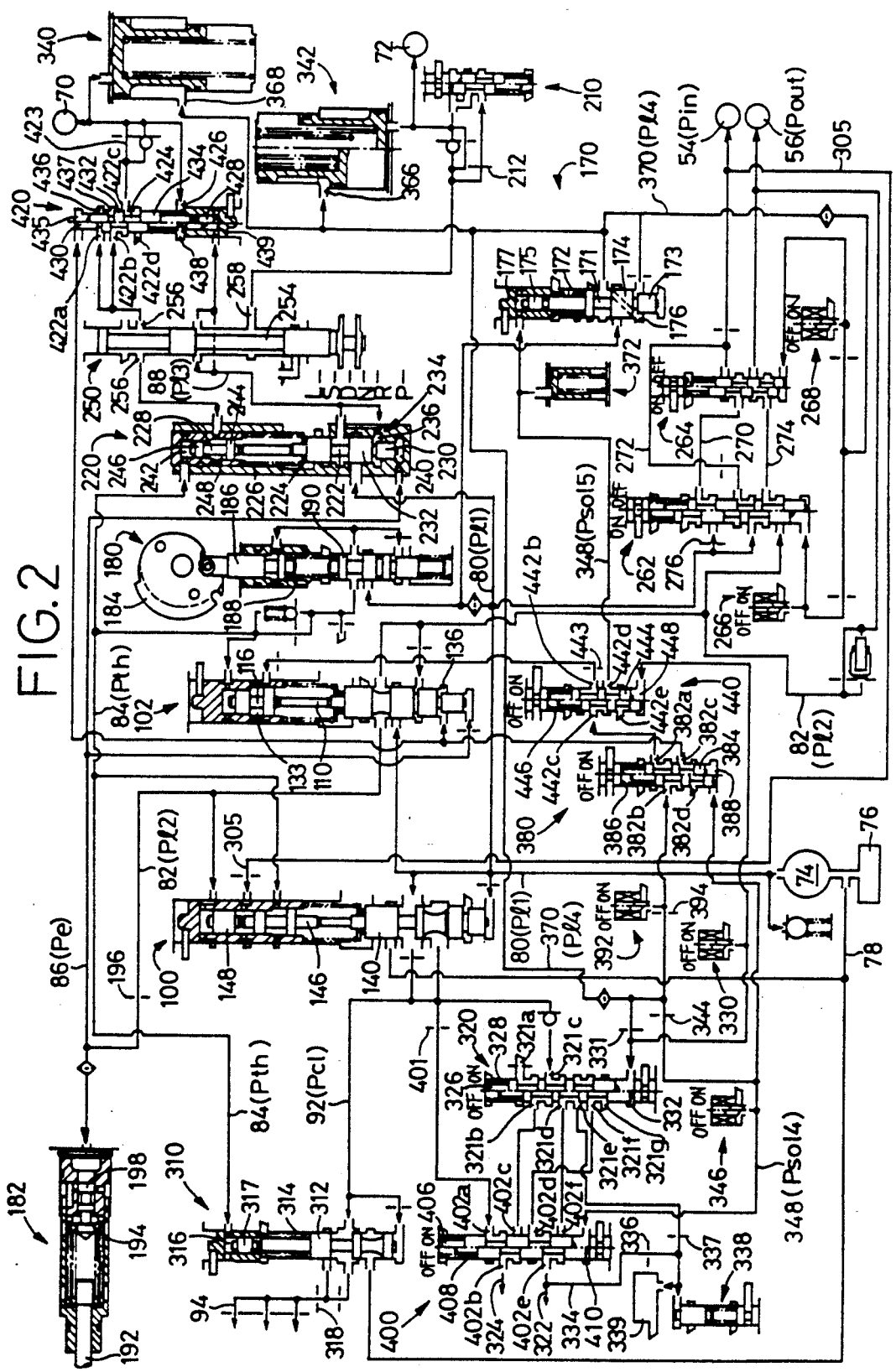
FIG. 2 is a hydraulic circuit diagram showing the hydraulic control apparatus adapted to control the power transmitting system of FIG. 1.

Referring next to FIG. 2 showing a hydraulic control circuit for controlling the vehicle power transmitting system of FIG. 1, reference numeral 74 designates an oil pump serving as a hydraulic power source of the hydraulic system, which constitutes a part of a hydraulic control apparatus constructed according to the instant embodiment of the present invention, which will be described. The oil pump 74 is connected to the pump impeller 28 of the fluid coupling 12, whereby the pump 74 is always rotated with the crankshaft 26 of the engine 10. In operation, the pump 74 pumps up a working fluid through a strainer 76 from a reservoir to which the fluid is returned. The pump 74 also communicates with a return line 78, so that the fluid returned through the return line 78 is sucked into the pump 74. The pressurized fluid produced by the pump 74 is delivered as a first line pressure Pl1 into a first pressure line 80. In the present embodiment, the first line pressure Pl1 is regulated by an overflow or relief type first pressure regulating valve 100, which discharges the fluid in the first pressure line 80 into the return line 78 and a lock-up clutch line 92. The first line pressure Pl1 is lowered by the above-indicated second pressure regulating valve 102, to produce the above-indicated second line pressure Pl2 in a second pressure line 82. The second pressure regulating valve 102 is of a pressure reducing type, contrary to the overflow type of the first pressure regulating valve 100.

Figure 3:
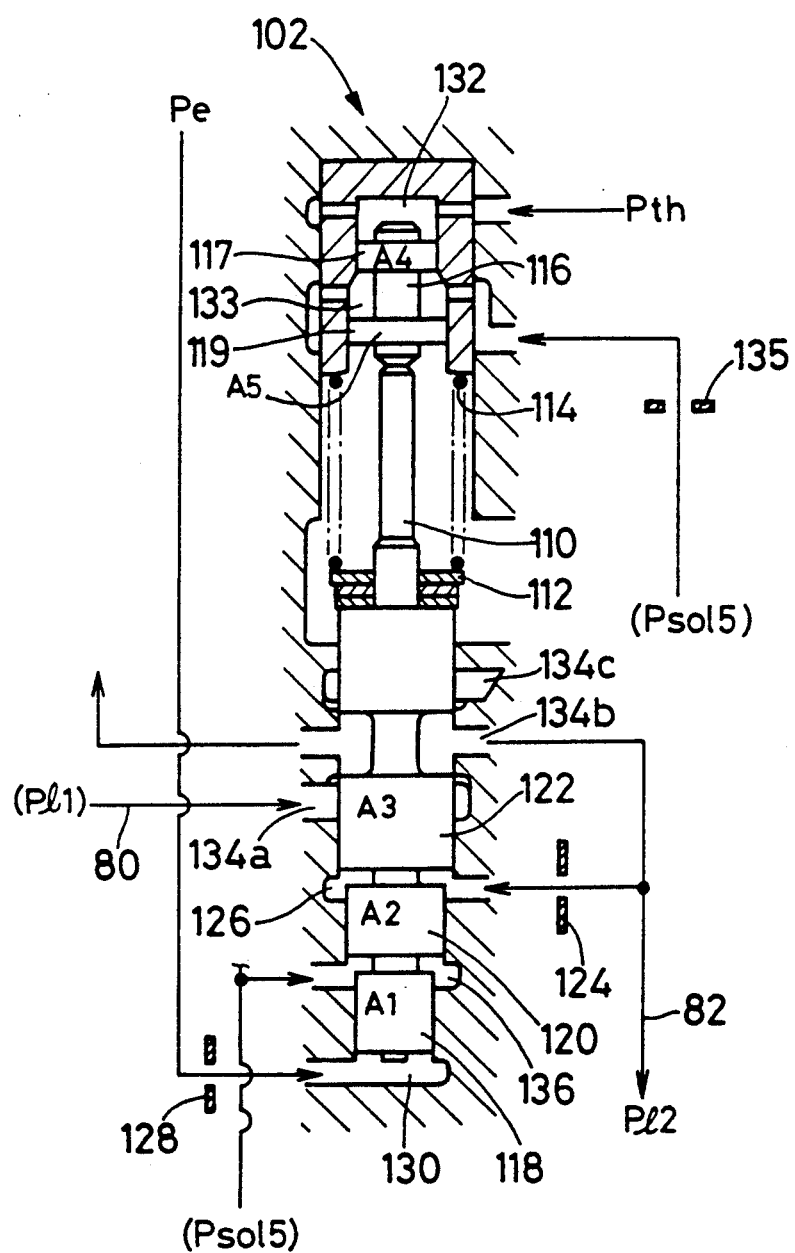
FIG. 3 is a view illustrating in detail a second pressure regulating valve incorporated in the apparatus of FIG. 2.

The second pressure regulating valve 102 will be first described in detail, by reference to FIG. 3.

This pressure regulating valve 102 includes a valve spool 110 for effecting connection and disconnection of the first pressure line 80 to and from the second pressure line 82, a spring sheet 112, a return spring 114, and a plunger 116. The valve spool 110 is provided at one axial end portion thereof remote from the plunger 116, with a first, a second and a third land 118, 120 and 122, which have different diameters. The first land 118 at the extreme end of the spool 110 has the smallest diameter, while the axially innermost third land 118 has the larger diameter. Between the second and third lands 120, 122, there is formed a chamber 126 to which is applied as a feedback pressure the second line pressure Pl2 through a flow restrictor 124, so that the valve spool 110 is biased toward its closed position by the second line pressure Pl2. Another chamber 130 is formed adjacent to the first land 118 at the above-indicated one end of the valve spool 110. To this chamber 130, there is applied a SPEED-RATIO pressure Pe (which will be described) through a flow restrictor 128. This pressure Pe also biases the valve spool 110 toward the closed position. The return spring 114 disposed around the valve spool 110 biases the spool 110 toward its open position, through the spring sheet 112.

The plunger 116 has a fourth land 117 at the other end thereof. This fourth land 117 partially defines another chamber 132. This chamber 132 is adapted to receive a THROTTLE pressure Pth (which will be described) which biases the spool 110 toward its open position. The plunger 116 also has a fifth land 119 having a diameter slightly larger than the fourth land 117. The fifth land 119 is located near the fourth land 117, and cooperates with the fourth land 117 to define a further chamber 133.

The valve spool 110 is positioned under equilibrium of forces according to the following equation (1):

$$Pl2 = (A4 \cdot Pth + W - A1 \cdot Pe)/(A3 - A2) \tag{1}$$

where,
A1: pressure-receiving area of the first land 118
A2: cross sectional area of the second land 120
A3: cross sectional area of the third land 122
A4: cross sectional area of the fourth land 117
W: biasing force of the return spring 114

Figure 7:
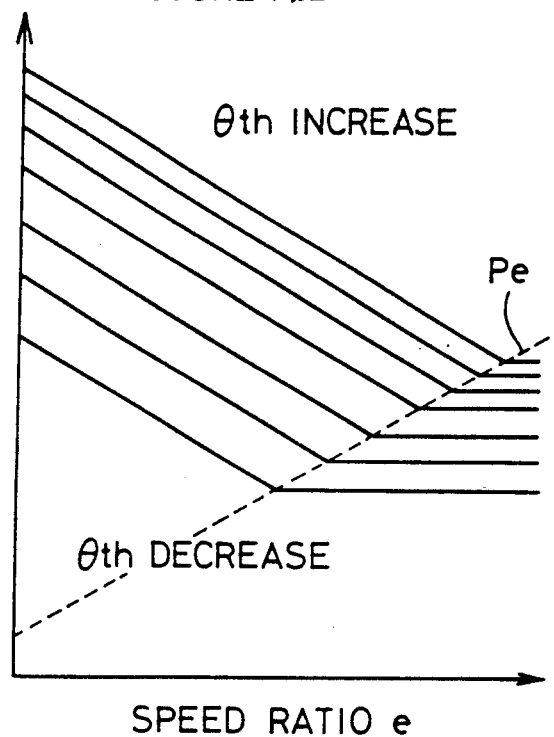
FIG. 7 is a graph showing an output characteristic of the second pressure regulating valve of FIG. 3.

Namely, the valve spool 110 is axially moved according to the equation (1), so as to repeatedly alternately establish communication between a port 134a and a port 134b for permitting a flow of the fluid from the first pressure line 80 into the second pressure line 82, and communication between the port 134b and a drain port 134c for draining the second pressure line 82 through the drain port 134c. As a result, the second line pressure Pl2 is produced. Since the second pressure line 82 is a closed hydraulic circuit, the second line pressure Pl2 can be adjusted by the second pressure regulating valve 102, by lowering the relatively high first line pressure Pl1, as indicated in FIG. 7.

Between the first and second lands 118, 120 of the valve spool 110 of the second pressure regulating valve 102, there is formed a chamber 136 adapted to receive a pilot pressure Psol5 through a second line pressure reducing control valve 380 which will be described. As the valve spool 110 is biased toward its closed position by the pilot pressure Psol5 applied to the chamber 136, the second line pressure Pl2 is accordingly reduced. The pilot pressure Psol5 is also applied to the chamber 133 between the fourth and fifth lands 117, 119, through a second relay valve 440 (which will be described) and a flow restrictor 135. As the valve spool 110 is biased toward its open position by the pilot pressure Psol5 applied to the chamber 133, the second line pressure Pl2 is accordingly increased. The reduction and increase in the second line pressure will be described later in more detail.

Figure 4:
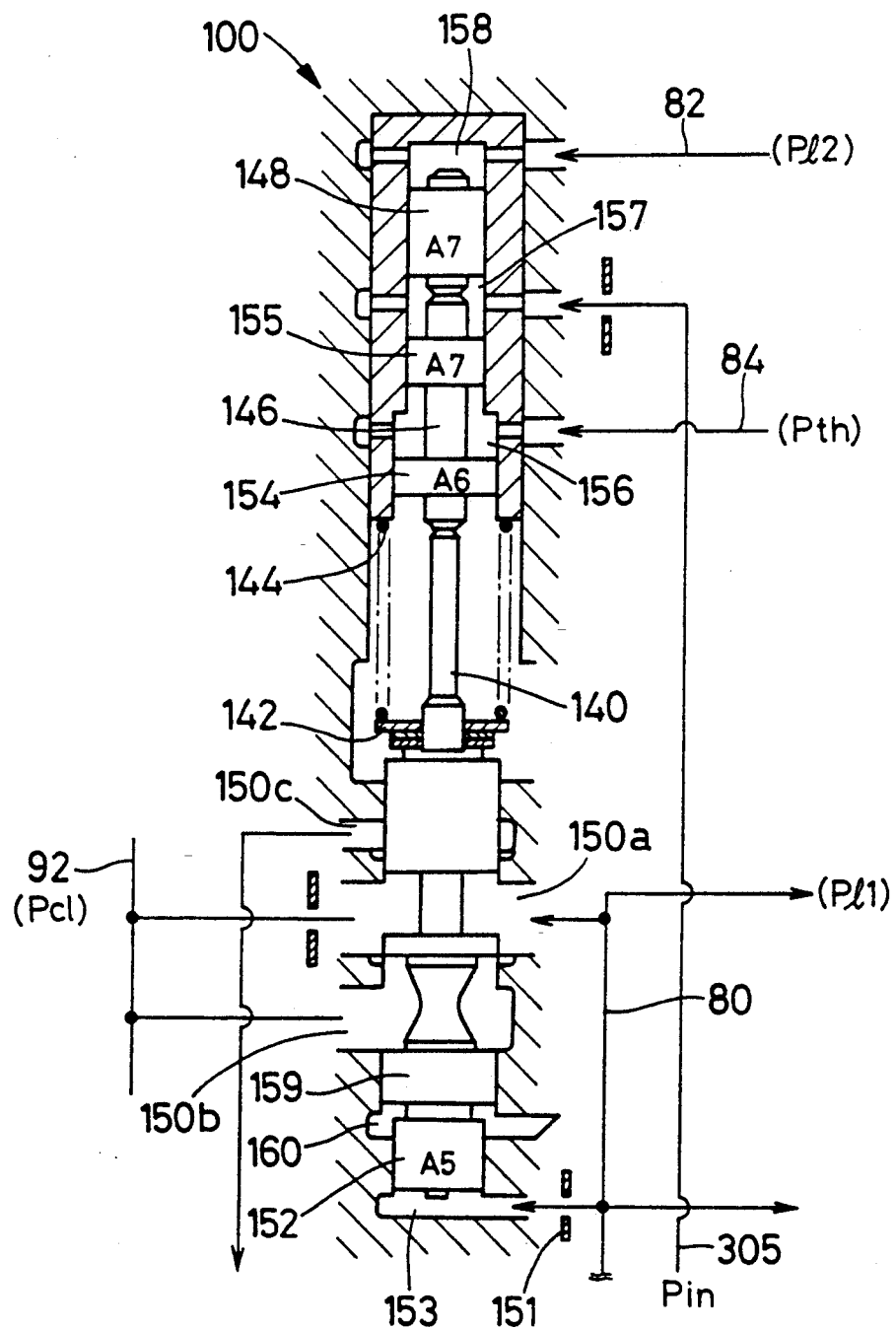
FIG. 4 is a view illustrating in detail a first pressure regulating valve also incorporated in the apparatus of FIG. 2.

Referring next to FIG. 4, the first pressure regulating valve 100 will then be described. This valve 100 includes: a valve spool 140, a spring sheet 142, a return spring 144, a first plunger 146, and a second plunger 148 whose diameter is the same as a second land 155 of the first plunger 146. The valve spool 100 is operated to effect selective connection and disconnection of a port 150a communicating with the first pressure line 80, to and from a drain port 150b or 150c. The valve spool 140 has a first land 152 at one axial end thereof remote from the first and second plungers 146, 148. Adjacent to the first land 152 of the spool 140, there is formed a chamber 153 which receives as a feedback pressure the first line pressure Pl1 through a flow restrictor 151. The valve spool 140 is biased toward its open position by this first line pressure Pl1. The first plunger 146, which is coaxial with the valve spool 140, has a first land 154 which cooperates with the above-indicated second land 155 to define a chamber 156 adapted to receive the THROTTLE pressure Pth. Between the second land 155 of the first plunger 146 and the second plunger 148, there is formed a chamber 157 adapted to receive a pressure Pin in the first hydraulic cylinder 54, through a branch line 305. Further, a chamber 158 is formed adjacent to the end face of the second plunger 148. The chamber 158 receives the second line pressure Pl2. The biasing force of the above-indicated return spring 144 acts on the valve spool 140 through the valve sheet 142 so as to bias the spool 140 toward its closed position. The valve spool 140 is positioned under equilibrium of forces according to the following equation (2):

$$Pl1 = [(Pin \text{ or } Pl2) \cdot A7 + Pth(A6 - A7) + W]/A5 \tag{2}$$

where,
A5: pressure-receiving area of the first land 152 of the valve spool 140
A6: cross sectional area of the first land 154 of the first plunger 146
A7: cross sectional area of the second land 155 of the first plunger 146 (second plunger 148)
W: biasing force of the return spring 144

In the first pressure regulating valve 100, the first and second plungers 146, 148 are separated from each other and a thrust due to the pressure Pin in the first cylinder 54 acts on the valve spool 140 in the direction toward the closed position, when the pressure Pin is higher than the second line pressure Pl2 (which is normally equal to the pressure Pout in the second cylinder 56). When the pressure Pin is lower than the second line pressure Pl2, the first and second plungers 146, 148 are held in abutting contact with each other, whereby a thrust due to the second line pressure Pl2 acting on the end face of the second plunger 148 acts on the valve spool 140 in the direction toward its closed position. That is, the second plunger 148 receiving the pressure Pin and the second line pressure Pl2 applies to the spool 140 a force based on the higher one of the pressures Pin and Pl2, so that the spool 140 is biased toward its closed position. Between the first and second lands 152 and 159 of the valve spool 140 which is open to the drain.

Figure 5:
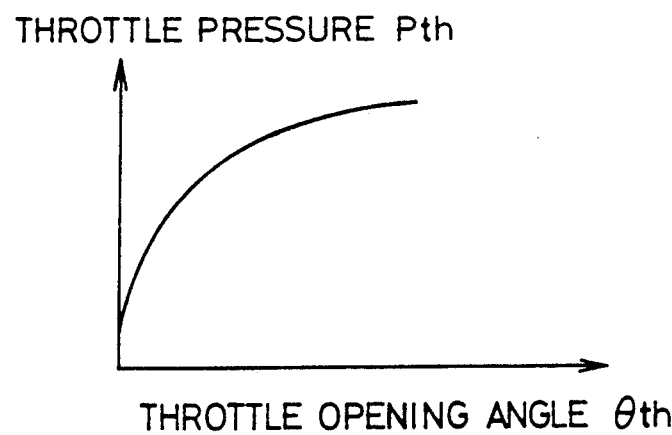
FIG. 5 is a graph indicating an output characteristic of a throttle sensing valve incorporated in the apparatus of FIG. 2.

Referring back to FIG. 2, the THROTTLE pressure Pth representing an actual opening angle θth of a throttle valve of the engine 10 is generated by a flow restrictor sensing valve 180. Further, the SPEED-RATIO pressure Pe representing an actual speed ratio "e" of the CVT 14 is generated by a speed-ratio sensing valve 182. Described specifically, the throttle sensing valve 180 includes: a cam 184 rotated as the throttle valve is operated; a plunger 186 which engages a cam surface of the cam 184 and which is axially moved by a distance corresponding to an angle of rotation of the cam 184; a spring 188; and a valve spool 190 which receives a thrust through the spring 188 from the plunger 186, and a thrust due to the first line pressure Pl1. These two thrust forces act on the spool 190 in the opposite directions. The valve spool 190 is moved to a position of equilibrium of the above two thrust forces, whereby the first line pressure Pl1 is reduced so as to produce the THROTTLE pressure Pth corresponding to the actual opening angle θth of the throttle valve. The relationship between the THROTTLE pressure Pth and the opening angle θth is indicated in the graph of FIG. 5. The THROTTLE pressure Pth is applied through a line 84 to the above-described first and second pressure regulating valves 100, 102, a third pressure regulating valve 220, and a lock-up pressure regulating valve 310.

Figure 6:
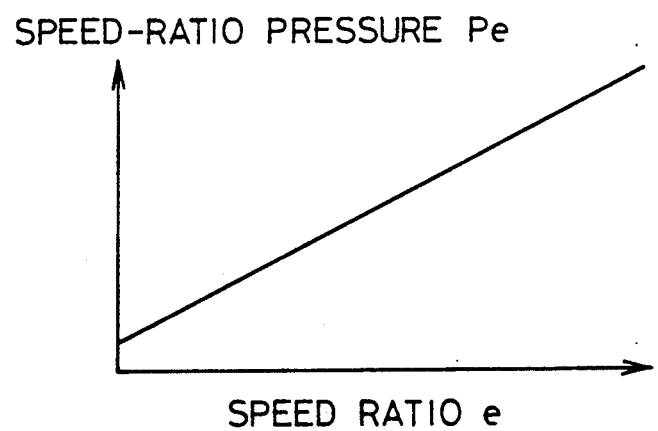
FIG. 6 is a graph indicating an output characteristic of a speed-ratio sensing valve incorporated in the apparatus of FIG. 2.

The speed-ratio sensing valve 182 includes: a sensing rod 192 which slidably contacts the axially movable rotor 50 on the input shaft 30 of the CVT 14 and which is axially displaced by a distance equal to an amount of axial movement of the movable rotor 50; a spring 194 whose biasing force varies as the axial position of the rod 192 is changed; and a valve spool 198 which receives the biasing force of the spring 194 and the second line pressure Pl2. The valve spool 196 is moved to a position of equilibrium of the biasing force of the spring 194 and a thrust force based on the second line pressure Pl2, whereby the amount of discharge flow of the fluid from the second pressure line 82 into the drain is adjusted depending upon the speed-ratio "e" of the CVT 14. For example, as the movable rotor 50 is moved toward the stationary rotor 46 so as to reduce the effective width of the V-groove of the pulley 40 and thereby increase the speed ratio "e", the sensing rod 192 is moved in a direction to compress the spring 194, thereby reducing the rate of flow of the fluid which is supplied from the second pressure line 82 through an orifice 196 and discharged into the drain by a resulting movement of the valve spool 198. As a result, the pressure in a portion of the line 82 downstream of the orifice 196 is increased. This pressure is utilized as the SPEED-RATIO pressure Pe, which increases with an increase in the speed ratio "e" of the CVT 14, as indicated in the graph of FIG. 6. The pressure Pe is applied through a line 86 to the second and third pressure regulating valves 102 and 220.

Figure 8:
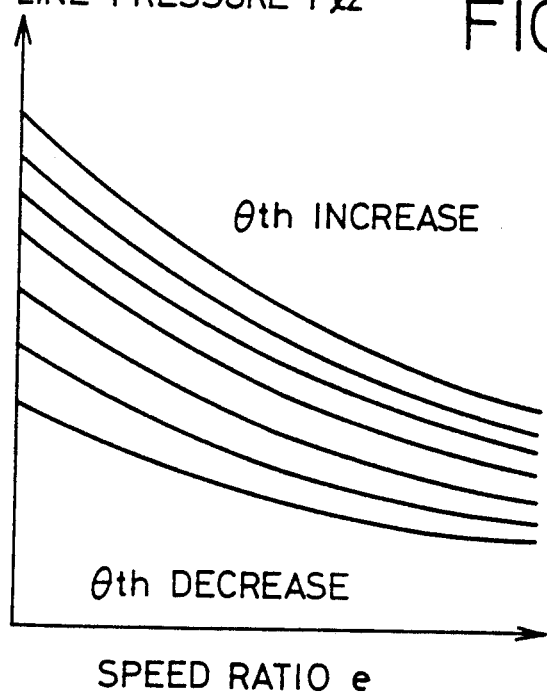
FIG. 8 is a graph showing an ideal relationship of a second line pressure of the apparatus of FIG. 2 with a speed ratio of a CVT of the power transmitting system and an opening angle of a throttle valve of the vehicle.

It will be understood from the above description of the speed-ratio sensing valve 182 that since the SPEED-RATIO pressure Pe is produced by changing the amount of discharge of the fluid supplied from the second pressure line 82 through the orifice 196, the pressure Pe will not exceed the second line pressure Pl2. Further, the second line pressure Pl2 is lowered with an increase in the pressure Pe, by the second pressure regulating valve 102 according to the equation (1) indicated above. Therefore, when the pressure Pe increases up to the level of the second line pressure Pl2, both of the pressures Pe and Pl2 are held constant, as indicated in the graph of FIG. 7, which shows that the lower limit of the second line pressure Pl2 adjusted by the second pressure regulating valve 102 is determined by the SPEED-RATIO pressure Pe, i.e., the speed ratio "e" of the CVT 14. Namely, the present hydraulic arrangement assures the curve of the second line pressure Pl2 (as indicated in FIG. 7) which is similar or approximate to an ideal curve as shown in FIG. 8 that permits the tension of the belt 44 to be maintained at an optimum value. In other words, the present hydraulic arrangement does not require an electromagnetically operated pressure control servo valve for continuously controlling the second line pressure Pl2. In this respect, the present hydraulic control apparatus provides significant reduction in the cost of manufacture.

The third pressure regulating valve 220 is adapted to produce a third line pressure Pl3 suitable for operating the REVERSE brake 70 and FORWARD clutch 72 of the reversing device 16. This valve 220 includes a valve spool 222 for effecting selective connection and disconnection of the first pressure line 80 to and from a third pressure line 88, a spring sheet 224, a return spring 226, and a plunger 228. The valve spool 222 has a first and a second land 230, 232, between which is formed a chamber 236, which is adapted to receive the third line pressure Pl3 as a feedback pressure through a flow restrictor 234, so that the spool 222 is biased toward its closed position by the pressure Pl3. Adjacent to the first land 230 of the spool 222, there is formed another chamber 240 which receives the SPEED-RATIO pressure Pe through a flow restrictor 238, so that the spool 222 is biased toward the closed position by the pressure Pe. In the third pressure regulating valve 220, a biasing force of the return spring 226 acts on the spool 222 through the spring sheet 224, so that the spool 222 is biased toward its open position by the spring 226. Adjacent to the end face of the plunger 228, there is formed a chamber 242 adapted to receive the THROTTLE pressure Pth, so that the spool 222 is biased toward the open position by the pressure Pth. The plunger 228 has a first land 244, and a second land 246 having a smaller diameter than the first land 244. Between these first and second lands 244, 246, there is formed a chamber 248 adapted to receive the third line pressure Pl3 only when the vehicle runs in the reverse direction with the REVERSE brake 70 placed in the engaged position. In the third pressure regulating valve 220 constructed as described above, the valve spool 222 is moved to a position of equilibrium of forces according to an equation similar to the equation (1), so that the third line pressure Pl3 is controlled to an optimum level based on the SPEED-RATIO and THROTTLE pressures Pe and Pth. The optimum level is a permissible lowest value required to permit the reversing device 16 to transmit received input torque without slipping of the brake 70 or clutch 72.

When the REVERSE brake 70 is placed in the engaged position, the third line pressure Pl3 is applied to the chamber 248, whereby the force biasing the spool 222 toward the open position is increased, to thereby increase the third line pressure Pl3. This arrangement assures optimum torque transmitting capacity of the FORWARD clutch 72 and REVERSE brake 70 during engagement of the clutch 72 or brake 70 to run the vehicle in the forward or reverse direction.

The thus regulated third line pressure Pl3 is applied to the FORWARD clutch 72 or REVERSE brake 70 by means of a shift lever valve 250. This shift lever valve 250 has a valve spool 254 which is moved in response to an operation of the shift lever 252, which has six operating positions, i.e., NEUTRAL "N", PARKING "P", LOW "L", SECOND "S", DRIVE "D" and REVERSE "R". The shift lever valve 250 has an output port 256 and an output port 258. When the shift lever 252 is placed in one of the forward-drive positions LOW, SECOND and DRIVE positions "L", "S" and "D", the third line pressure Pl3 is supplied primarily through the output port 258 to the FORWARD clutch 72, while at the same time the fluid is discharged from the brake 70. When the shift lever 252 is placed in the REVERSE position "R", the third line pressure Pl3 is supplied through the output port 256 to the ports 422a, 422b of a REVERSE INHIBIT valve 420 and to the REVERSE brake 70 through the valve 420, while at the same time the fluid is discharged from the FORWARD clutch 72. When the shift lever 252 is placed in the NEUTRAL position "N" or PARKING position "P", the fluid is discharged from the brake 70 and clutch 72 at the same time.

Accumulators 340 and 342 are connected to the brake 70 and clutch 72, respectively, for the purpose of slowly raising the pressure applied to the brake and clutch 70, 72, so that the frictionally coupling devices of the brake and clutch may be smoothly engaged. A shift timing valve 210 connected to the clutch 72 functions to prevent a transient excessively high rate of flow of the fluid to the clutch 72, such that a flow restrictor 212 is closed with a rise in the pressure in the cylinder of the clutch 72.

The first and second line pressures Pl1 and Pl2 adjusted by the first and second pressure regulating valves 100, 102, respectively, are applied to the one and the other of the first and second hydraulic cylinders 54, 56 of the CVT 14 through a shift control valve assembly 260, for controlling the speed ratio "e" of the CVT 14. The shift control valve assembly 260 has a directional control valve 262 and a flow control valve 264. These control valves 262, 264 receive through a fourth pressure line 370 a fourth line pressure Pl4 which is produced by a fourth pressure regulating valve 170 based on the first line pressure Pl1.

The fourth pressure regulating valve 170 includes a valve spool 171 for connection and disconnection between the first pressure line 80 and the fourth pressure line 370, and a spring 172 for biasing the spool 171 toward its open position. Between a first and a second land 173, 174 of the spool 171, there is formed a chamber 176 which receives a fourth line pressure Pl4 as the feedback pressure. The spool 171 also has a third land 175 at the end remote from the first land 173. The third land 175 partially defines a chamber 177 which receives a pilot pressure Psol5 (which will be described) which acts to bias the spool 171 toward its open position. The end face of the first land 173 is exposed to the atmosphere. In the thus constructed fourth pressure regulating valve 170, the valve spool 171 is positioned for equilibrium between the valve closing biasing force based on the fourth line pressure Pl4 and the valve opening biasing force based on the pilot pressure Psol4. As a result, the fourth line pressure Pl4 is adjusted according to the pilot pressure Psol5, as described below.

Figure 9:
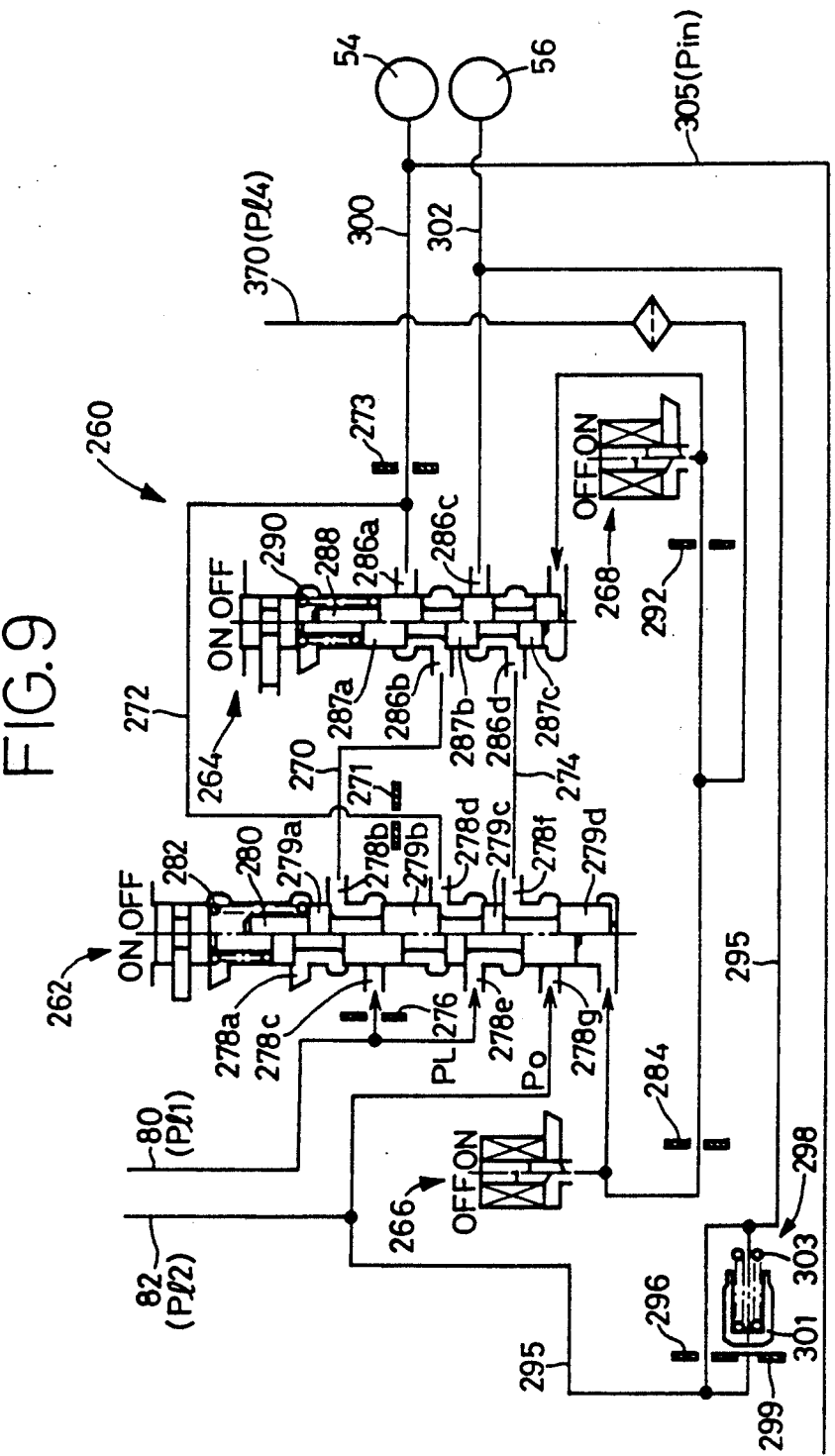
FIG. 9 is a view illustrating in detail a shift control valve assembly of the apparatus of FIG. 2.

Referring to FIG. 9 which shows the details of the shift control valve assembly 260, the directional control valve 262 is a spool valve controlled by a first solenoid-operated valve 266. The valve 262 has a 278a connected to the drain, and ports 278b, 278d and 278f which communicate with respective first, second and third connecting lines 270, 272 and 274, respectively. The connecting line 272 is provided with a flow restrictor 271. The directional control valve 262 further has a port 278c receiving the first line pressure Pl1 through a flow restrictor 276, a port 278e receiving the first line pressure Pl1, and a port 278g receiving the second line pressure Pl2. The valve 262 includes a valve spool 280 which is axially slidably movable between a shift-down position corresponding to one end (upper end as viewed in FIG. 9) of an operating stroke thereof, and a shift-up position corresponding to the other end (lower end as viewed in FIG. 9) of the operating stroke. The spool 280 is biased by a spring 282 toward its shift-up position.

The valve spool 280 has four lands 279a, 279b, 279c and 279d which open and close the above-indicated ports of the valve 262. The upper end of the spool 280 on the side of the spring 282 is exposed to the atmosphere. On the other hand, the lower end of the spool 280 is exposed to the fourth line pressure Pl4 when the first solenoid-operated valve 266 is placed in the ON or closed position. With the valve 266 placed in the OFF or open position, however, the fourth line pressure Pl4 is released through the valve 266 located downstream of a flow restrictor 284, whereby the fourth line pressure Pl4 is not applied to the lower end of the valve spool 280. While the first solenoid valve 266 is ON (indicated at ON in FIG. 9), the valve spool 280 is placed in the shift-down position (indicated at ON in FIG. 9). While the valve 266 is OFF (indicated at OFF in FIG. 9), the spool 280 is placed in the shift-up position (indicated at OFF in FIG. 9). In this arrangement, while the spool 280 is placed in its shift-down position with the valve 266 being held ON, the ports 278a and 278b are connected to each other and the ports 278e and 278f are connected to each other, while the ports 278b and 278c are disconnected from each other, the ports 278d and 278e are disconnected from each other, and the ports 278f and 278g are disconnected from each other. While the spool 280 is placed in the shift-up position with the valve 266 being held OFF, the connecting and disconnecting states of the ports 278a–278g are reversed with respect to those in the shift-down position.

The flow control valve 264 of the shift control valve assembly 260 is a spool valve which is controlled by a second solenoid-operated valve 268, and functions as a valve for changing the speed or rate at which the CVT 14 is shifted. The valve 264 has a port 286a which communicates with the first hydraulic cylinder 54 through a first cylinder line 300 and with the second connecting line 272, ports 286b and 286d communicating with the first and third connecting lines 270, 274, respectively, and a port 286c which communicate with the second hydraulic cylinder 56 through a second cylinder line 302. The valve 264 includes a valve spool 288 which is axially slidably movable between a non-restricting position on the side of one end (upper end as viewed in FIG. 9) of an operating stroke thereof, and a flow-restricting position on the side of the other end (lower end as viewed in FIG. 9) of the operating stroke. The spool 288 is biased by a spring 290 toward its flow-restricting position.

The valve spool 288 has three lands 287a, 287b and 287c which open and close the above-indicated ports of the valve 264. As in the valve 262, the upper end of the spool 288 on the side of the spring 290 is exposed to the atmospheric pressure, with no hydraulic pressure applied thereto. On the other hand, the lower end of the spool 288 is exposed to the fourth line pressure Pl4 adjusted by the fourth pressure regulating valve 170 when the second solenoid-operated valve 268 is placed in the ON or closed position. With the valve 268 placed in the OFF or open position, however, the fourth line pressure Pl4 is released through the valve 268 located downstream of a flow restrictor 292, whereby the fourth line pressure Pl4 is not applied to the lower end of the valve spool 288. While the second solenoid valve 268 is ON (indicated at OFF in FIG. 9), the valve spool 288 is placed in the non-restricting position (indicated at ON in FIG. 9). While the valve 268 is OFF (indicated at OFF in FIG. 9), the spool 288 is placed in the flow-restricting position (indicated at OFF in FIG. 9). In this arrangement, while the second solenoid-operated valve 268 is ON (with the duty cycle set at 100%), the spool 288 is placed in its non-restriction position. In this state, the ports 286a and 286b are connected to each other and the ports 286c and 286d are connected to each other. While the solenoid-operated valve 288 is OFF (with the duty cycle set at 0%), the spool 288 is placed in the flow-restricting position, whereby the ports 286a and 286b are disconnected and the ports 286c and 286d are disconnected.

The second hydraulic cylinder 56 communicates with the second pressure line 82 through a by-pass line 295 in which a flow restrictor 296 and a check valve 298 are connected in parallel. This check valve 298 is provided to prevent a rapid decrease in the pressure Pout (=Pl1) in the second hydraulic cylinder 56 with the fluid being discharged from the cylinder 56 into the second pressure line 82, when the first line pressure Pl1 is applied to the cylinder 56, during a shift-down operation of the CVT 14 which requires the pressure Pout to be higher than the pressure Pin in the first cylinder 54, or during an engine-braking operation in which torque is transmitted in the direction from the output shaft 38 of the CVT 14 to the input shaft 30.

The flow restrictor 296 and the check valve 298 prevent or minimize a phenomenon of pulsation of the pressure Pout in the second cylinder 56 which would occur in synchronization with the duty cycling operation of the flow control valve 264. Described more specifically, the upper peak of the spike of the pressure Pout is released through the flow restrictor 296, while the lower peak of the pressure Pout is compensated for by the check valve 298. The check valve 298 includes a valve seat 299 having a flat seat surface, a valve member 301 having a flat operating surface which is abuttable on the valve seat 299, and a spring 303 for biasing the valve member 301 against the seat 299. This check valve 298 is adapted to be opened when a pressure difference across the valve exceeds about 0.2 kg/cm$^2$.

The first cylinder line 300 has a second flow restrictor 273 disposed between the point of connection with the second connecting line 272 and the point of connection with a branch line 305 leading to the first pressure regulating valve 100. This second flow restrictor 273 determines the rapid shift-down speed of the CVT 14, such that the shift-down speed is a maximum value that assures a non-slipping operation of the transmission belt 44. The first flow restrictor 271 and the flow restrictor 296 in the by-pass line 295 determine the slow shift-up speed of the CVT 14, while the flow restrictor 276 associated with the port 278c of the directional control valve 262 determines the rapid shift-up speed of the CVT 14.

When the first solenoid-operated valve 266 is turned ON, the speed ratio "e" of the CVT 14 is reduced to reduce the speed of the vehicle, irrespective of the operating state of the second solenoid-operated valve 268. When the second solenoid-operated valve 268 is turned ON with the first solenoid-operated valve 266 held ON, the fluid in the first pressure line 80 is fed into the second cylinder 56 through the ports 278e and 278f, third connecting line 274, ports 286d and 286c and second cylinder line 302. At the same time, the fluid in the first cylinder 54 is discharged into the drain through the first cylinder line 300, ports 286a and 286b, first connecting line 270, port 278b and drain port 278a. That is, the CVT 14 is operated in a rapid shift-down mode I as indicated in FIG. 10, so that the speed ratio "e" of the CVT 14 is rapidly reduced so as to lower the running speed of the vehicle.

When the second solenoid-operated valve 268 is turned OFF while the first solenoid-operated valve 266 is placed in the ON position, the fluid in the second pressure line 82 is fed into the second cylinder 56 through the by-pass line 295 (incorporating the parallel connection of the flow restrictor 296 and check valve 298), while the fluid in the first cylinder 54 is discharged through a small clearance which is purposely or inherently formed or provided between the piston and the mating sliding surface of the cylinder 54. That is, the CVT 14 is operated in a slow shift-down mode III as indicated in FIG. 10, so that the speed ratio "e" of the CVT 14 is slowly reduced.

Figure 10:
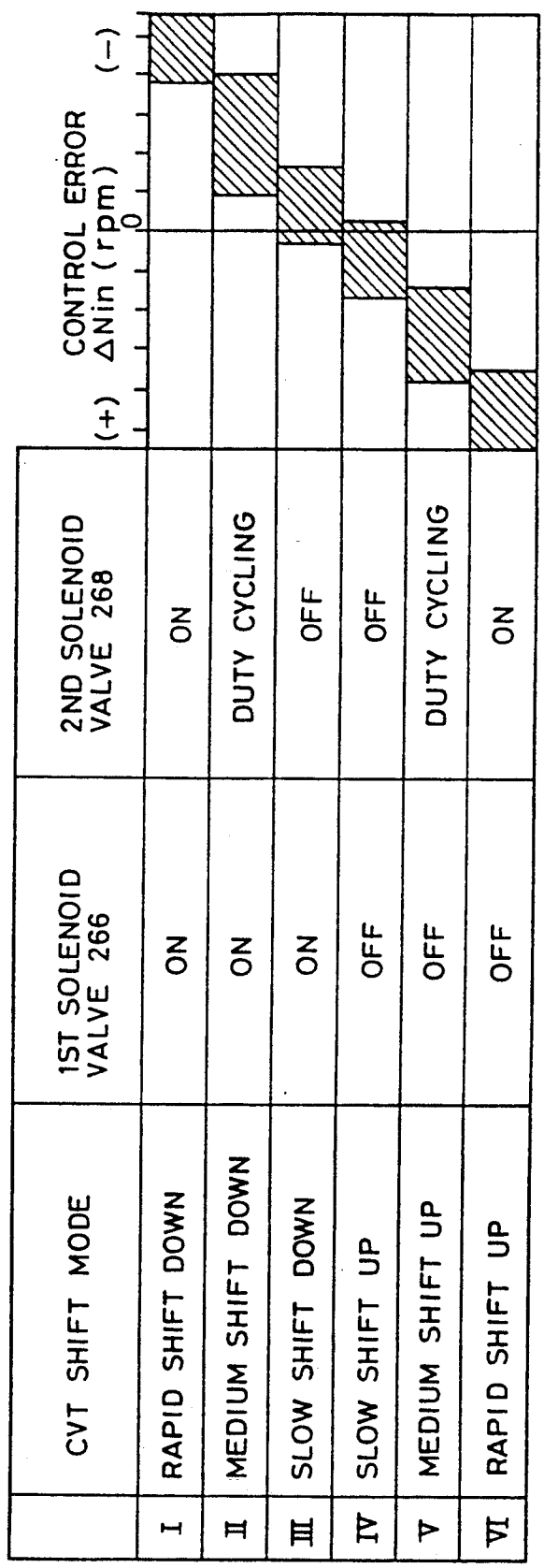
FIG. 10 is a view indicating a relationship between on-off states of a first and a second solenoid valve of the valve assembly of FIG. 9 and a shifting mode of the CVT.

When the second solenoid-operated valve 288 is alternately turned ON and OFF at the controlled duty cycle while the first solenoid-operated valve 266 is ON, the CVT 14 is operated in a medium shift-down mode II as indicated in FIG. 10, so that the CVT 14 is shifted down at a rate intermediate between the shift-down rates in the rapid and slow shift-down modes I and III. In this medium shift-down mode II, the shift-down rate is determined by the duty cycle of the valve 268.

When the first solenoid-operated valve 266 is turned OFF, the speed ratio "e" of the CVT 14 is increased so as to increase the vehicle running speed, irrespective of the operating state of the second solenoid-operated valve 268. When the second solenoid-operated valve 268 is turned ON while the first solenoid-operated valve 266 is OFF, the fluid in the first pressure line 80 is fed into the first cylinder 54 through the flow restrictor 276, ports 278c and 278b, first connecting line 270, ports 286b and 286a and first cylinder line 300, and also through the ports 278e and 278d, second connecting line 272 and first cylinder line 300. At the same time, the fluid in the second cylinder 56 is discharged into the second pressure line 82 through the second cylinder line 302, ports 286c and 286d, third connecting line, and ports 278f and 278g. Namely, the CVT 14 is operated in a rapid shift-up mode VI as indicated in FIG. 10, so that the speed ratio e is rapidly increased.

When the second solenoid-operated valve 268 is turned OFF while the first solenoid-operated valve 266 is OFF, the first connecting line 270 is closed by the flow control valve 264. As a result, the fluid in the first pressure line 80 is fed into the first cylinder 54 primarily through the second connecting line 272 provided with the first flow restrictor 271. At the same time, the fluid in the second cylinder 56 is slowly discharged into the second pressure line 82 through the flow restrictor 296. Namely, the CVT 14 is operated in a slow shift-up mode IV as indicated in FIG. 10, so that the speed ratio "e" is slowly increased, due to the flow restrictors 271 and 296.

When the second solenoid-operated valve 268 is alternately turned ON and OFF at the controlled duty cycle while the first solenoid-operated valve 266 is OFF, the CVT 14 is operated in a medium shift-up mode as indicated in FIG. 10, so that the speed ratio "e" is increased at a rate intermediate between the rates in the slow and rapid shift-up modes IV and VI.

Figure 11:
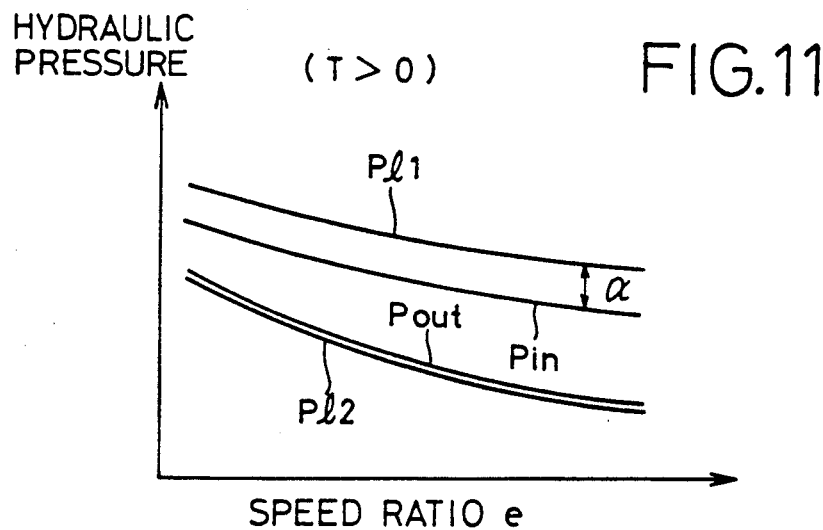
FIGS. 11, 12 and 13 are graphs indicating relationships between the speed ratio of the CVT and hydraulic pressures at different locations of the apparatus of FIG. 2, where the vehicle is running in normal, engine-brake and non-load running conditions, respectively.
Figure 12:
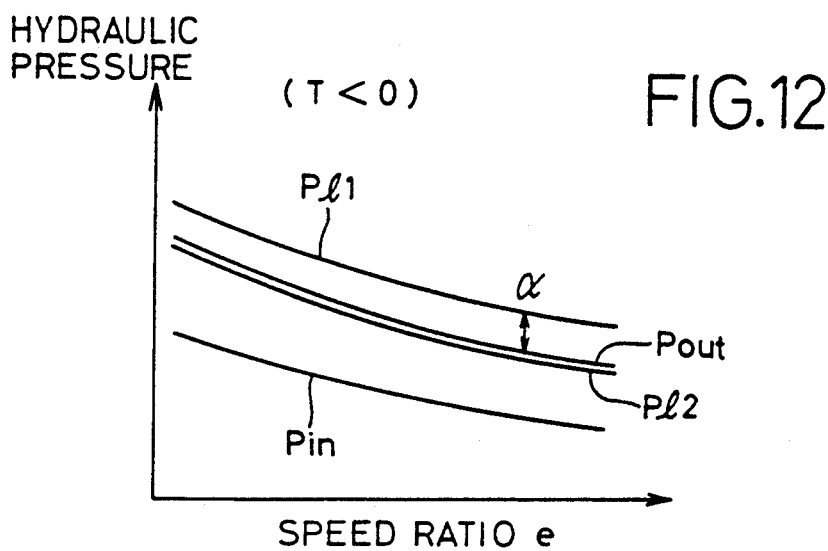
Figure 13:
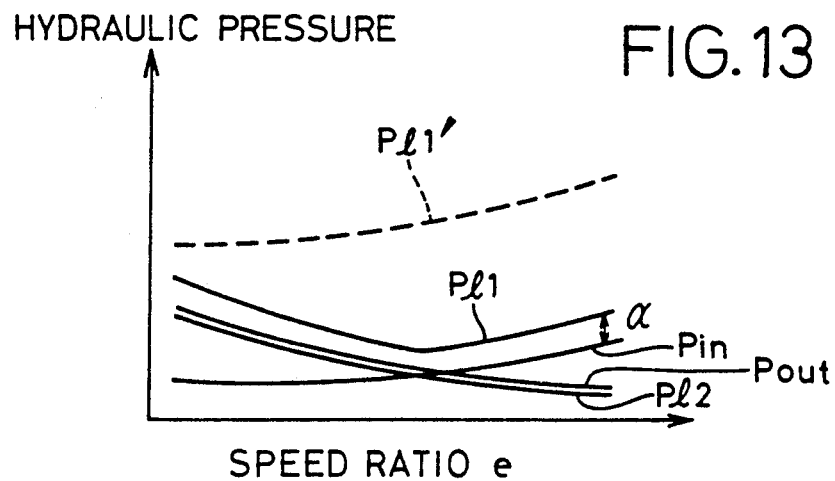

In the CVT 14, it is desirable that the first line pressure Pl1 have an optimum value with respect to the second line pressure Pl2 and the cylinder pressures Pin and Pout, as indicated in FIG. 11 when torque T is transmitted through the CVT 14 in the forward direction from the input shaft 30 toward the output shaft 38 (when the torque T is positive), and as indicated in FIG. 12 when the torque T is transmitted in the reverse direction from the output shaft 30 toward the input shaft 30 as in an engine-brake running of the vehicle (when the torque T is negative). The optimum value of the first line pressure Pl1 as shown in FIGS. 10 and 11 varies with the speed ratio "e" of the CVT 14, with the torque of the input shaft 30 is constant at a given level. In the present embodiment wherein the first and second hydraulic cylinders 54, 56 have the same pressure-receiving area, the pressure Pin in the first cylinder 54 is higher than the pressure Pout in the second cylinder 56 during the positive-torque running of the vehicle, as indicated in FIG. 11. On the other hand, the pressure Pout is higher than the pressure Pin during the negative-torque running (engine-brake running) of the vehicle, as indicated in FIG. 12. That is, the pressure in the driving side cylinder 54, 56 is higher than the pressure in the driven side cylinder 54, 56. In the positive-torque running of FIG. 11, the pressure Pin in the driving side cylinder 54 provides a thrust which determines the speed ratio "e" of the CVT 14. In view of this, the first line pressure Pl1 is desirably adjusted so as to be higher than the pressure Pin by an extra amount $\alpha$ which is a minimum value required to establish the desired speed ratio "e" with a minimum power loss. However, it is impossible to adjust the first line pressure Pl1 based on one of the pressures Pin and Pout of the two cylinders 54, 56. In view of this, the first pressure regulating valve 100 is provided with the second plunger 148, so that the valve spool 140 of the valve 100 receives a biasing force based on a higher one of the pressure Pin and the second line pressure Pl2. According to this arrangement, the first line pressure Pl1 is determined based on the higher one of the pressures Pin and Pl2 whose curves intersect each other as indicated in FIG. 13, i.e., based on the higher pressure Pin or Pl2 while the vehicle is running with no load applied to the CVT 14. More precisely, the optimum first line pressure Pl1 is determined by adding the above-indicated required minimum extra value $\alpha$, so that the first line pressure Pl1 is a minimum level required to obtain the desired speed ratio "e" with a minimum power loss. A curve indicated in broken line in FIG. 13 represents the first line pressure Pl1' where the first pressure regulating valve 100 is not provided with the second plunger 148. This curve indicates that the first line pressure Pl1' is unnecessarily high when the desired speed ratio "e" is relatively high.

As indicated above, the extra value $\alpha$ is a minimum value which is required to change the speed ratio "e" of the CVT 14 over its entire range available. It will be understood from the above equation (2) that the first line pressure Pl1 increases in relation to the THROTTLE pressure Pth, since the pressure-receiving areas of the relevant elements of the first pressure regulating valve 100 and the biasing force of the spring 144 are so determined. Although the first line pressure Pl1 adjusted by the first pressure regulating valve 100 increases with the pressure Pin or Pl2 and the THROTTLE pressure Pth, the pressure Pl1 is saturated at a highest value which varies with the THROTTLE pressure Pth ($\theta$th), as indicated in FIG. 14. This arrangement prevents an excessive rise in the first line pressure Pl1 (higher than the pressure Pin in the first cylinder 54 by the extra value $\alpha$), even if the pressure Pin increases, while the speed ratio "e" is the highest value with the minimum width of the V-groove of the first pulley 40 (while the movement of the movable rotor 50 is mechanically prevented).

Referring back to FIG. 2, the fluid discharged from the port 150$b$ of the first pressure regulating valve 100 is fed into the lock-up clutch line 92, and directed to a lock-up pressure regulating valve 310 for producing as a LOCK-UP CLUTCH pressure Pcl suitable for operating the lock-up clutch 36 of the fluid coupling 12. The lock-up pressure regulating valve 310 has a valve spool 312 which receives as a feedback pressure the LOCK-UP CLUTCH pressure Pcl. The spool 312 is biased by this feedback pressure Pcl toward its open position. The valve 310 further has a spring 314 for biasing the spool 312 to the closed position, a chamber 316 to which is applied the THROTTLE pressure Pth, and a plunger 317 which receives the pressure in the chamber 316 to thereby bias the spool 312 toward the closed position. The valve spool 312 is moved to a position of equilibrium between a thrust based on the feedback pressure Pcl and a biasing force of the spring 314, whereby the LOCK-UP CLUTCH pressure Pcl in the lock-up clutch line 92 is suitably adjusted depending upon the THROTTLE pressure Pth. Therefore, the lock-up clutch 36 is engaged with a required minimum engaging force which increases with the currently required output torque of the engine 10. The fluid discharged from the lock-up pressure regulating valve 310 is supplied to various portions of the power transmitting system through a flow restrictor 318 and a lubrication line 94, and is returned to the return line 78 connected to the oil pump 74.

The fourth pressure line 370 is connected to a second relay valve 440 through a flow restrictor 331, and a third solenoid-operated valve 330 is provided between the restrictor 331 and the second relay valve 440. When the third solenoid-operated valve 330 is placed in its OFF position, the pressure in a portion of the line connecting the restrictor 331 and second relay valve 440 is drained. When the valve 330 is ON, the valve 330 produces a pilot pressure Psol3 which is equal to the fourth line pressure Pl4 in the fourth pressure line 370. The fourth pressure line 370 is also connected to a rapid lock-up clutch release valve 400 through a flow restrictor 344, and a fourth solenoid-operated valve 346 is provided between the restrictor 344 and the rapid lock-up clutch release valve 400. When the fourth solenoid-operated valve 400 is placed in the OFF position, the pressure in a portion of the line connecting the restrictor 344 and the valve 400 is drained. When the valve 346 is ON, the valve 346 produces a pilot pressure Psol4 which is equal to the fourth line pressure Pl4. The fourth pressure line 370 is also connected to the second line pressure reducing control valve 380 through a flow restrictor 394. A fifth solenoid-operated valve 392 is provided between the restrictor 394 and the valve 380. When the valve 392 is OFF, the pressure in a portion of the line connecting the restrictor 394 and valve 380 is drained. When the valve 392 is ON, the valve 392 produces a pilot pressure Psol5 which is equal to the fourth line pressure Pl4. In the present embodiment, the combinations of the pilot pressures Psol3, Psol4 and Psol5 permit a plurality of hydraulic control operations for normal engagement and rapid release of the lock-up clutch 36, back pressure control of the accumulator 340, reduction in the second line pressure Pl2 when the shift lever 252 is placed in the NEUTRAL position "N", reduction in the second line pressure at a high running speed of the vehicle, and reverse inhibit control operation (which will be described).

The operations of the lock-up clutch control valve 320 and rapid lock-up clutch release valve 400 for effecting engagement and rapid releasing of the lock-up clutch 36 will be described. The lock-up clutch control valve 320 functions to supply the LOCK-UP CLUTCH pressure Pc1 in the lock-up clutch line 92 to the engaging line 322 or the releasing line 324 of the fluid coupling 12, for engaging or releasing the lock-up clutch 36. The rapid lock-up clutch release valve 400 functions to permit the fluid discharged from the lock-up clutch 36 to be fed into the drain without passing through the oil cooler 339, so that the lock-up clutch 36 is rapidly released.

The lock-up clutch control valve 320 is a spool valve which includes ports 321a–321g, a valve spool 326 having a first and a second position, and a spring 328 for biasing the spool 326 toward the first or releasing position (indicated at OFF in FIG. 2). When the valve spool 326 is placed in the second or engaging position (indicated at ON in FIG. 2), the port 321c receiving the LOCK-UP CLUTCH pressure Pc1 and the port 321d are connected to each other, the port 321b and the drain port 321a are connected to each other, and the ports 321e and 321f are connected to each other. When the spool 326 is placed in the first or releasing position, the ports 321c and 321b are connected to each other, the ports 321d and 321e are connected to each other, and the ports 321f and 321g are connected to each other. The lower end of the spool 326 (remote from the spring 328) partially defines a chamber 332 which receives the pilot pressure Psol3 when the third solenoid-operated valve 330 is placed in the ON position.

The rapid lock-up clutch release valve 400 is a spool valve which includes a port 402a communicating with the lock-up clutch line 92 through a flow restrictor 401, a port 402b communicating with the releasing line 324, a port 402c communicating with the port 321b of the lock-up clutch control valve 320, a port 402d communicating with the port 321f of the lock-up clutch control valve 320, a port 402e communicating with the engaging line 322, and a port 402f communicating with the port 321d of the valve 320. The rapid lock-up clutch release valve 400 further has a valve spool 406 having a third and a fourth position, and a spring 408 for biasing the spool 406 toward its fourth or rapid release position (indicated at ON in FIG. 2). When the valve spool 406 is placed in the third or normal release position (indicated at OFF in FIG. 2), the ports 402b and 402c are connected to each other, while the ports 402e and 402f are connected to each other. When the spool 406 is placed in the fourth or rapid release position, the ports 402a and 402b are connected to each other, while the ports 402d and 402e are connected to each other. The lower end of the spool 406 partially defines a chamber 410 which receives the pilot pressure Psol4 when the fourth solenoid-operated valve 346 is placed in the ON position. In FIG. 2, the ON and OFF positions of the third solenoid-operated valve 330 correspond to the ON and OFF positions of the lock-up clutch control valve 320, respectively, while the ON and OFF positions of the fourth solenoid-operated valve 346 correspond to the ON and OFF positions of the rapid lock-up clutch release valve 400, respectively.

When the third solenoid-operated valve 330 is turned ON while the fourth solenoid-operated valve 346 is OFF, the spool 326 is moved to the engaging or ON position, the fluid in the lock-up clutch line 92 is fed into the engaging chamber 33 of the fluid coupling 12 through the ports 321c, 321d, 402f, 402e and the engaging line 322, while at the same time the fluid in the releasing chamber 35 is discharged into the drain through the releasing line 324, ports 402b, 402c, 321b and 321a. Thus, the lock-up clutch 36 is engaged in an engaging mode as indicated in FIG. 15. The fluid passages for feeding and discharging the fluid into and out of the fluid coupling 12 for engaging the lock-up clutch 36 as described above are referred to as "third fluid passage means".

When the third solenoid-operated valve 330 is turned OFF while the fourth solenoid-operated valve 346 is OFF, the fluid in the lock-up clutch line 92 is fed into the releasing chamber 35 of the fluid coupling 12 through the ports 321c, 321b, 402c and 402b and the releasing line 324, while at the same time the fluid in the engaging chamber 33 is discharged into the drain through the engaging line 322, ports 402e, 402f, 321d and 321e, and oil cooler 339. Thus, the lock-up clutch is released in a first release mode as indicated in FIG. 15. The fluid passages for feeding and discharging the fluid into and out of the fluid coupling 12 for releasing the clutch 36 as described above are referred to as "first fluid passage means".

When the third and fourth solenoid-operated valves 330 and 346 are both turned ON, the fluid in the lock-up clutch line 92 is fed into the releasing chamber 35 of the fluid coupling 12 through the ports 402a and 402b and the releasing line 324, while at the same time the fluid in the engaging chamber 33 is discharged through the engaging line 322, ports 402e, 402d, 321f and 321e, and oil cooler 339. Thus, the lock-up clutch 36 is released in a second release mode as indicated in FIG. 15. The fluid passages for feeding and discharging the fluid into and out of the fluid coupling 12 for releasing the lock-up clutch 36 as described above are referred to as "fourth fluid passage means".

Since the first and second release modes are available, the lock-up clutch 36 is not erroneously held in the engaged position even if the spool 326 of the lock-up clutch control valve 320 is stuck in the ON position or the spool 406 of the lock-up clutch rapid release clutch 400 is stuck in the OFF position. In other words, if the lock-up clutch 36 remains in the engaged position even after a predetermined one of the first and second release modes is commanded to be established for releasing the clutch 36, the other release mode is selected to release the clutch 36, whereby the otherwise possible engine stall is prevented, and the vehicle can be smoothly restarted. Further, if the spool 326 of the valve 320 is stuck in the OFF position or the spool 406 of the valve 400 is stuck in the ON position, the lock-up clutch 36 is actually placed in the rapid release mode even if the engaging mode is commanded to be selected. In this case, the other release mode is selected. If the rapid release mode is continuously established, the fluid is charged without passing through the oil cooler 339, and the working fluid may be overheated. Therefore, the provision of the first and second release modes prevents the overheating of the working fluid in the event of a trouble with the valve 320.

Where the lock-up clutch 36 should be rapidly released upon application of an abrupt brake to the vehicle, the third and fourth solenoid-operated valves 320 and 346 are placed in the OFF and ON positions, respectively. In this case, a rapid release mode is established as indicated in FIG. 15. In this rapid release mode, the fluid in the lock-up clutch line 92 is fed into the releasing chamber 35 primarily through the ports 402a and 402b and the releasing line 324, while at the same time the fluid in the engaging chamber 33 is discharged through the engaging line 322, and the ports 402e, 402d, 321f and 321g. That is, the engaging chamber 33 is drained without the fluid passing through the oil cooler 339 which has a relatively high fluid flow resistance. Accordingly, the lock-up clutch 36 is rapidly released. The fluid passages for rapidly releasing the clutch 36 are referred to as "second fluid passage means".

The pressure of the working fluid discharged to the drain without passing through the oil cooler 339 is lowered to a suitable level by a cooler pressure control relief valve 338 disposed upstream of the oil cooler 339.

The engaging line 322 is connected to the oil cooler 339 by a by-pass line 334 which is provided with a flow restrictor 336. Another flow restrictor 337 is provided between the flow restrictor 336 and the lock-up clutch control valve 320. These restrictors 336 and 337 determines the rates of flow of the fluid from the engaging chamber 33 of the fluid coupling 12 and the valve 320 into the oil cooler 339. That is, a portion of the fluid is cooled by the oil cooler 339 even while the lock-up clutch 36 is placed in the engaged position.

There will next be described the operations of the first relay valve 380 and a second relay valve 440 for effecting the above-indicated accumulator back pressure regulating operation, second line pressure reduction with the shift lever 252 in the NEUTRAL position "N", second line pressure reduction at a high vehicle speed, and reverse inhibit control operation.

The first relay valve 380 has a port 382a communicating with a port 442c of the second relay valve 440, a port 382b receiving the pilot pressure Psol5, a port 382c communicating with the chamber 136 of the second pressure regulating valve 102 and a chamber 435 of the REVERSE INHIBIT valve 420 (previously indicated), and a drain port 382d. The first relay valve 380 has a spool 384 having ON and OFF positions as indicated in FIG. 2, and a spring 386 for biasing the spool 384 toward the OFF position. When the spool 384 is placed in the OFF position, the ports 382a and 382b are connected to each other, while the port 382c and drain port 382d are connected to each other. When the spool 384 is placed in the ON position, the port 382a is connected to the drain, while the ports 382b and 382c are connected to each other. The end of the spool 384 remote from the spring 386 partially defines a chamber 388 adapted to receive the pilot chamber Psol4. When the pilot pressure Psol4 is not applied to the chamber 388, the spool 384 is placed in the OFF position, whereby the pilot pressure Psol5 is applied to the chamber 136 of the second pressure regulating valve 201 and to the chamber 435 of the REVERSE INHIBIT valve 420. When the pilot pressure Psol4 is applied to the chamber 388, the spool 384 is moved to the ON position, whereby the pilot pressure Psol5 is applied to the port 442c of the second relay valve 440. In FIG. 2, the ON and OFF positions of the first relay valve 380 correspond to the ON and OFF positions of the fourth solenoid-operated valve 346, respectively.

The second relay valve 440 has ports 442b and 442c which communicate with each other and with the chamber 133 of the second pressure regulating valve 102 through a flow restrictor 443, a port 442d which communicates with the accumulator 372 and the fourth pressure regulating valve 170, and a drain port 442e. The valve 440 has a spool 444 which is movable between an ON and an OFF position as indicated in FIG. 2, and a spring 446 for biasing the spool 444 toward the OFF position. With the spool 444 placed in the ON position, the port 442d is connected to the drain port 442e. With the spool 444 placed in the OFF position, the port 442d is disconnected from the drain port 442e. The end of the spool 444 remote from the spring 446 partially defines a chamber 448 adapted to receive the pilot pressure Psol3. When the pilot pressure Psol3 is not applied to the chamber 448, the spool 444 is placed in the OFF position. When the pilot pressure Psol3 is applied to the chamber 448, the spool 444 is moved to the ON position, whereby the pilot pressure Psol5 which is applied to the chamber 133 through the ports 442c, 442b is also applied to an accumulator 372 and a chamber 177 of the fourth pressure regulating valve 170. In FIG. 2, the ON and OFF positions of the second relay valve 440 correspond to the ON and OFF positions of the third solenoid-operated valve 330, respectively.

There will be described the back pressure control operations of the accumulators 340 and 342 for the FORWARD clutch 70 and REVERSE brake 72. When the fifth solenoid-operated valve 392 is operated in the duty cycling manner, the pilot pressure Psol5 produced downstream of the flow restrictor 394 varies with the duty cycle Ds5 of the valve 392, as indicated in FIG. 16. Thus, the restrictor 394 and the fifth solenoid-operated valve 392 function as means for producing the pilot pressure Psol5 which is applied to the accumulator 372 and the fourth pressure regulating valve 170 through a line 348, for regulating the back pressures of the accumulators 340, 342, while the first and second relay valves 380 and 440 are placed on the ON and OFF positions, respectively.

The back pressures of the accumulators 340, 342 are controlled in order to limit a rate of rise in the pressures in the cylinders of the clutch 72 and brake 70, for thereby reducing engaging shocks of the clutch 72 and brake 70, when the shift lever 252 is operated from the NEUTRAL position "N" to the DRIVE position "D" or REVERSE position "R". To this end, the fourth pressure regulating valve 170 is adapted to regulate the fourth line pressure Pl4 which is applied through a fourth pressure line 370 to back pressure ports 366 and 368 of the accumulators 342, 340 for the clutch 72 and brake 70. That is, the fourth pressure regulating valve 170 functions to control the pressure absorbing functions of the accumulators 342, 340, so as to minimize the engaging shocks of the clutch 72 and brake 70.

Figure 17:
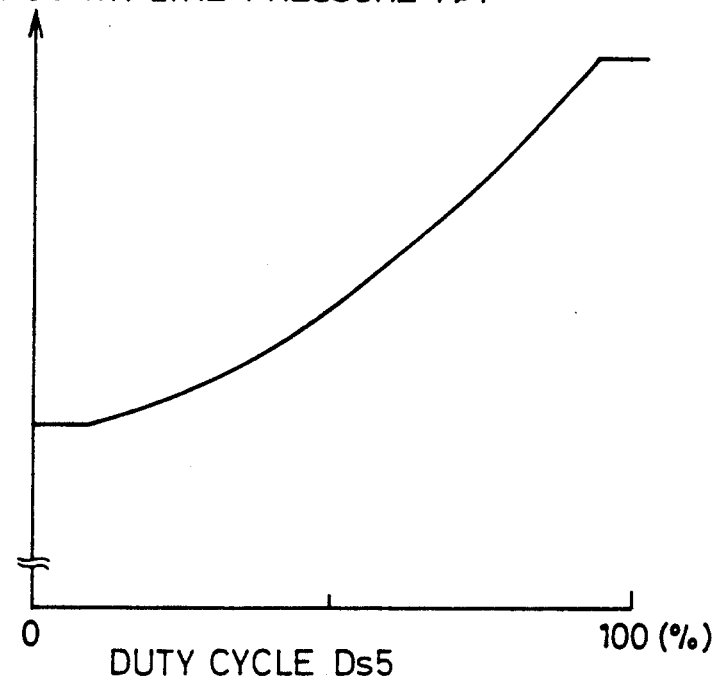
FIG. 17 is a view indicating a relationship between the duty cycle of the fifth solenoid valve and a fourth line pressure continuously changed with the duty cycle.

The fourth pressure regulating valve 170 is adapted to regulate the fourth line pressure Pl4 depending upon the pilot pressure Psol5. More specifically, when the shift lever 252 is shifted from the NEUTRAL position "N" to the DRIVE position "D" or REVERSE position "R", the fifth solenoid-operated valve 392 is operated in the duty cycling manner, so as to change the fourth line pressure Pl4 with the duty cycle Ds5, as indicated in FIG. 17, with the pilot pressure Psol5 being applied to the chamber 177 of the fourth pressure regulating valve 170. The duty cycle Ds5 is determined so that the back pressures of the accumulators 340, 342 determined by the fourth line pressure Pl4 minimize the engaging shock of the clutch 70 or brake 72. When the pressure in the cylinder of the clutch 72 rises to the third line pressure Pl3, the pilot pressure Psol5 which has been applied to the fourth pressure regulating valve 170 is cut off by the second relay valve 440, whereby the chamber 177 is exposed to the atmosphere, and the fourth line pressure Pl4 is regulated to a relatively low level in the neighborhood of 4 kg/cm$^2$, which corresponds to the biasing force of the spring 172 biasing the spool 171 toward the open position. The thus regulated fourth line pressure Pl4 is used primarily as a pilot pressure for controlling the directional and flow control valves 262, 264 of the shift control valve assembly 260. Thus, the fourth pressure regulating valve 170 functions as a device for generating a pilot pressure for operating the directional and flow control valves 262, 264. The accumulator 372 connected to the line 348 functions to absorb the pulsation of the pilot pressure Psol5 which would arise in relation to the frequency of the duty cycling drive pulses to activate the fifth solenoid-operated valve 392.

Then, there will be described the operation to lower the second line pressure Pl2 for protecting the transmission belt 44 against an overload due to a pressure rise in the driven side cylinder 54, 56, which pressure rise is caused by a centrifugal force during rotation of the driven side pulley 40, 42. More specifically, when the vehicle is running at a relatively high speed with the output shaft 38 of the CVT 14 rotating at a high speed, the second line pressure Pl2 applied to the driven side cylinder (e.g., cylinder 56) is lowered by turning OFF the fourth solenoid-operated valve 346 and first relay valve 380 and turning ON the fifth solenoid-operated valve 392. This reduction in the second line pressure Pl2 is effected irrespective of the operating states of the third solenoid-operated valve 330 and second relay valve 440. That is, the pilot pressure Psol5 (=Pl4) is applied to the chamber 136 of the second pressure regulating valve 102 through the ports 382b and 382c of the first relay valve 380, whereby the second line pressure Pl2 is regulated according to the following equation (3):

$$Pl2 = [A4 \cdot Pth + (A5 - A4) \cdot Psol5 + W - A1 \cdot Pe - (A2 - A1) \cdot Psol5]/(A3 - A2) \quad (3)$$

Figure 18:
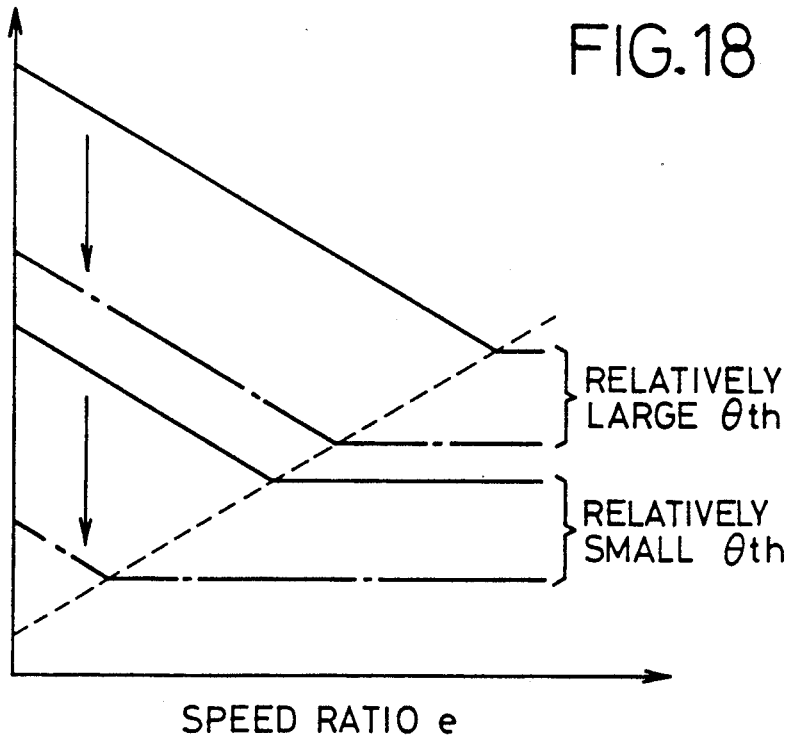
FIG. 18 is a view indicating the second line pressure which varies with the running speed of the vehicle.

The second line pressure Pl2 as regulated according to the above equation (3) as indicated in one-dot chain lines in FIG. 18 is lowered with respect to the normally regulated second line pressure as indicated in solid lines. The lowering of the pressure Pl2 eliminates or minimizes an adverse influence of an excessive rise in the driven side cylinder 56 due to the centrifugal force, whereby the durability of the transmission belt 44 is increased. The second line pressure Pl2 is lowered also when the reverse inhibit control operation (which will be described below) and when the shift lever 252 is operated to the NEUTRAL position "N". It is noted that the second line pressure Pl2 is normally regulated according to the equation (1), when the fourth solenoid-operated valve 346 is turned ON or fifth solenoid-operated valve 392 is turned OFF.

The REVERSE INHIBIT valve 420 is provided to inhibit the reversing device 16 from being placed in the reverse position with the REVERSE brake 70 engaged, when the vehicle is running in the forward direction. This valve 420 has ports 422a and 422b adapted to receive the third line pressure Pl3 from the output port 256 of the shift lever valve 250 when the valve 250 is placed in the REVERSE position "R". The REVERSE INHIBIT valve 420 further has a port 422c communicating with the cylinder of the REVERSE brake 70 through a line 423, and a drain port 422d. The valve 420 includes a valve spool 424 slidably movable between a first or non-inhibit position corresponding to one end (upper end) of the operating stroke and a second or reverse inhibit position corresponding to the other end (lower end) of the operating stroke. The spool 424 is biased by a spring 426 toward the first position. A plunger 428 is provided in abutting contact with the lower end of the spool 424. The plunger 428 has a smaller diameter than the spool 424. The upper end portion of the spool 424 has a first land 430, a second land 432 having a larger diameter than the first land 430, and a third land 434 having the same diameter of the second land 432. These three lands 430, 432, 434 are arranged from the upper end of the spool 424 in the order of description. The first land 430 at the upper end of the spool 424 partially defines the chamber 435 which is adapted to receive the pilot pressure Psol5 through the first relay valve 380 placed in the OFF position. The first and second lands 430, 432 define a chamber 436, while the second and third lands 432, 434 define a chamber 437. These chambers 436 and 437 are adapted to receive the third line pressure Pl3 from the shift lever valve 250 only when the shift lever 252 is placed in the REVERSE position "R". The spool 424 and the plunger 428 define a chamber 438 which is adapted to receive the pressure in the REVERSE brake 70. The plunger 428 partially defines a chamber 439 to which the third line pressure Pl3 is always applied. The area of the plunger 428 which receives the third line pressure Pl3 is substantially equal to the area of the first and second lands 430, 432 which receives the pressure in the chamber 436.

In the thus constructed REVERSE INHIBIT valve 420, the spool 424 is moved to the second or reverse inhibit position against the biasing force of the spring 426 to inhibit the reversing device 16 from being placed in the reverse position, when the valve closing thrust force based on the pilot pressure Psol5 and third line pressure Pl3 exceeds the valve opening thrust force based on the biasing force of the spring 426, pressure in the REVERSE brake 70 and third line pressure Pl3. In this reverse inhibit position, the ports 422b and 422c are disconnected from each other, while the port 422c and the drain port 422d are connected to each other, whereby the REVERSE brake 70 is drained. That is, when the pilot pressure Psol5 is applied to the chamber 435 with the fourth and fifth solenoid-operated valves 346 and 392 being turned OFF and ON, respectively, the reversing device 16 is prevented from being placed in the reverse position provided that the shift lever 252 is placed in the REVERSE position "R". However, the spool 424 of the REVERSE INHIBIT valve 420 is moved to the first or non-inhibit position under the biasing force of the spring 426, for communication of the REVERSE brake 70 with the port 256 of the shift lever valve 250, when the fourth solenoid-operated valve 346 is turned ON, or when the fifth solenoid-operated valve 392 is turned OFF, or when the shift lever 252 is moved to a position other than the REVERSE position "R". The REVERSE INHIBIT valve 420 functions to inhibit the REVERSE brake 70 from being engaged and maintain the reversing device 16 in the neutral position, if the shift lever 252 is operated from the DRIVE position "D" to the REVERSE position "R" through the NEUTRAL position "N", while the fourth and fifth solenoid-operated valves 346 and 392 are placed in the OFF and ON by an electronic control device 460 which will be described.

While the first relay valve 380 is OFF, that is, while the fourth solenoid-operated valve 346 is OFF, the pilot pressure Psol5 is applied to the chamber 136 of the second pressure regulating valve 102 through the first relay valve 380. As a result, the second line pressure Pl2 is lowered depending upon the pilot pressure Psol5, whereby the tension of the belt 44 of the CVT 14 is minimized to an extent that assures a non-slipping operation of the belt 44. Accordingly, the operating noise of the belt 44 is reduced, and the durability of the belt 44 is increased.

While the first and second relay valves 380 and 440 are both ON, that is, while the fourth and third solenoid-operated valves 346 and 330 are both ON, the pilot pressure Psol5 is applied to the chamber 133 of the second pressure regulating valve 102 through the first and second relay valves 380, 440, whereby the second line pressure Pl2 is raised by a suitable amount depending upon the pilot pressure Psol5. This increase in the second line pressure Pl2 is effected when the CVT 14 is rapidly shifted down due to an abrupt brake application or an operation of the shift lever 252 from the DRIVE position "D" to the LOW position "L", for example, or when the back pressures of the accumulators 340, 343 are controlled upon operation of the shift lever 252 from the NEUTRAL position "N" to the DRIVE or REVERSE position "D", "R". That is, the tension of the belt 44 of the CVT 14 is temporarily increased to increase the torque transmitting capacity of the CVT 14, to prevent otherwise possible slipping of the belt 44 on the pulleys 40, 42 in the above-indicated operating conditions of the vehicle.

FIG. 19 provides a table which indicates the control operations corresponding to the respective different combinations of the operating states of the third, fourth and fifth solenoid-operated valves 330, 346 and 392.

Referring back to FIG. 1, there is indicated the above-indicated electronic control device 460, which serves as control means for controlling the first, second, third fourth and fifth solenoid-operated valves 266, 268, 330, 346 and 392 incorporated in the hydraulic circuit shown in FIG. 2. These valves are selectively energized or turned ON by the control device 460, for controlling the speed ratio "e" of the CVT 14, the operating state of the lock-up clutch 36 of the fluid coupling 12, and the second line pressure Pl2, for example. The electronic control device 460 includes a so-called microcomputer which incorporates a central processing unit (CPU), a random-access memory and a read-only memory, as well known in the art.

The control device 460 receives various signals from various sensors, such as: a VEHICLE speed sensor 462 disposed to detect the rotating speed of the drive wheels 24, and generating a vehicle speed signal representative of the detected speed, i.e., a running speed V of the vehicle; an INPUT SHAFT speed sensor 464 disposed to detect the rotating speed of the input shaft 30 of the CVT 14, and generating an input shaft speed signal representative of the detected speed Nin of the input shaft 30; an OUTPUT SHAFT speed sensor 466 disposed to detect the speed of the output shaft 38 of the CVT 14, and generating an output shaft speed signal representative of the detected speed Nout of the output shaft 38; a THROTTLE sensor 468 disposed to detect an angle of opening of the throttle valve disposed in a suction pipe of the engine 10, and generating a throttle signal representative of the opening angle $\theta$th of the throttle valve; a SHIFT LEVER sensor 470 disposed to detect the currently selected operating position of the shift lever 252, and generating a signal representative of the currently selected position Ps of the shift lever 252; a BRAKE switch 472 disposed to detect an operation of a brake pedal of the vehicle, and generating a signal indicative of the operation of the brake pedal; and an ENGINE SPEED switch 474 disposed to detect a speed Ne of the engine 10, and generating a signal indicative of the engine speed Ne. The CPU of the electronic control device 460 processes these input signals according to control programs stored in the ROM, while utilizing a temporary data storage function of the RAM, and applies appropriate drive or control signals to the first, second, third, fourth and fifth solenoid-operated valves 266, 268, 330, 346 and 392.

Upon application of power to the control device 460, a main control routine is executed after the initialization of the device. In the main control routine, the speeds Nin and Nout of the input and output shafts 30, 38, speed ratio "e" of the CVT 14, the vehicle running speed V and other running parameters of the vehicle are calculated based on the input signals received from the various sensors indicated above. Based on the received input signals, the control device 460 operates to control the lock-up clutch 36 and the CVT 14, and effect the control operations such as the accumulator back pressure control operation, second line pressure reduction and increase, as indicated in FIG. 19, in a controlled sequence depending upon the operating conditions of the vehicle.

Figure 20A:
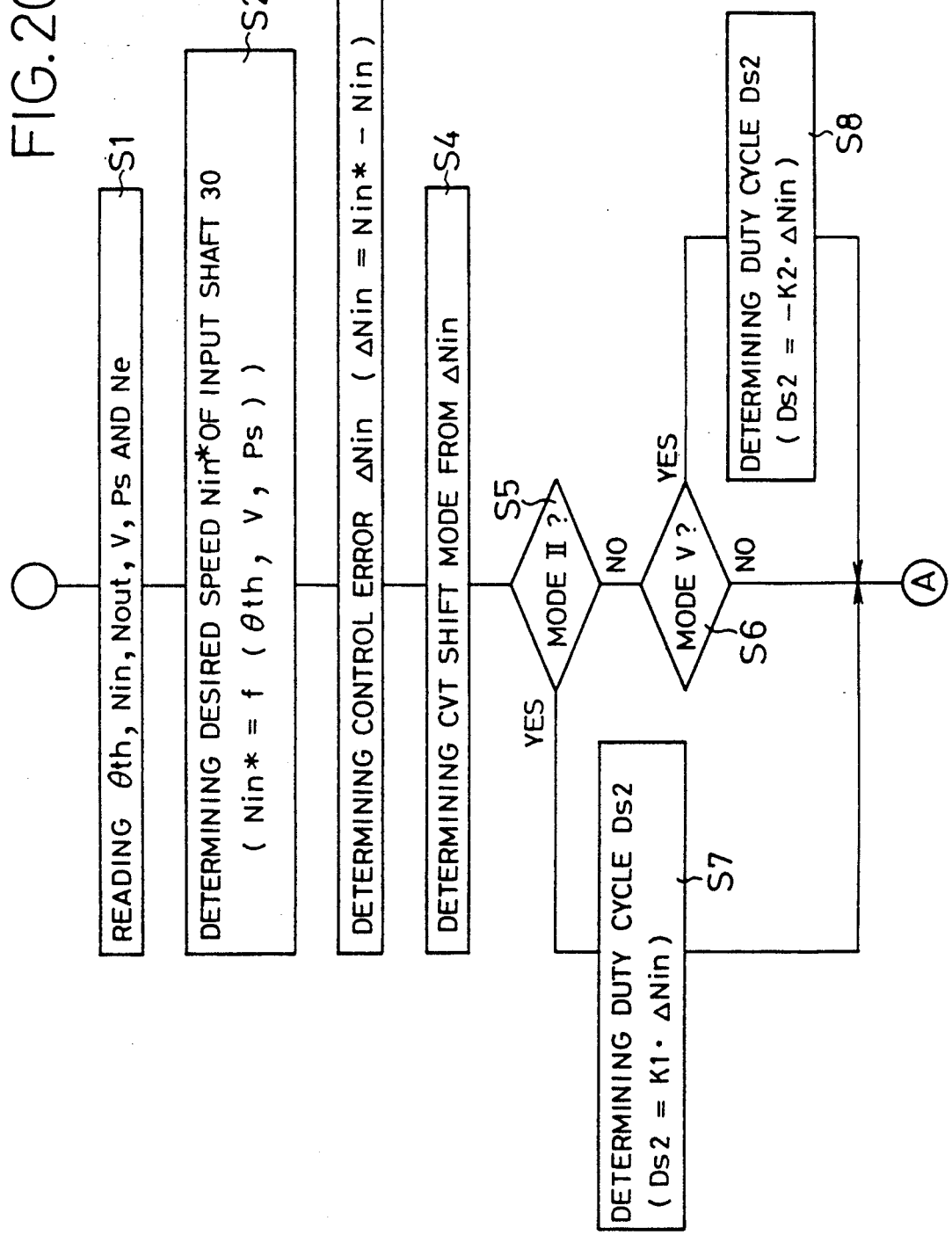

The shifting operations of the CVT 14 are controlled, for example, according to a control program as illustrated in the flow chart of FIGS. 20A and 20B.

Initially, step S1 is executed to read in the various input signals from the various sensors, and to calculate the vehicle running speed V, speeds Nin and Nout of the input and output shafts 30, 38, throttle opening angle $\theta$th, currently selected position Ps of the shift lever 252, and engine speed Ne, based on the received input signals. Then, the control flow goes to step S2 in which a desired or target speed Nin* of the input shaft 30 is determined based on the shift lever position Ps, throttle opening angle $\theta$th and vehicle running speed V, more precisely, according to a predetermined relationship represented by a functional equation Nin*=f($\theta$th, V, Ps). This relationship, which is stored in the ROM of the control device 460, is determined for each of the DRIVE, SECOND and LOW positions "D", "S" and "L" of the shift lever 252, so that the relevant relationship provides a currently required output of the engine 10 represented by the throttle opening angle $\theta$th, with a minimum fuel consumption by the engine 10. When the shift lever 252 is placed in the SECOND or LOW position "S", "L", it is generally required or desirable that the vehicle runs in a sporty manner with high drivability, and with a relatively high effect of engine-braking. In view of this requirement, the relationship used for the SECOND or LOW position is determined so that the desired input shaft speed Nin* is higher than that for the DRIVE position, or so that the speed ratio "e" is comparatively low. While the present power transmitting system (shift lever 252 and shift lever valve 250) has the three forward drive positions, DRIVE (D), SECOND (S) and LOW (L), the forward drive positions may be determined otherwise. For example, three or more forward drive positions may be provided in addition to the DRIVE position.

In the following step S3, the CPU of the control device 460 determines a control error $\Delta$Nin (=Nin*−Nin) which is a difference between the speed Nin of the input shaft 30 actually detected by the sensor 464 and the determined desired speed Nin*. Step S3 is followed by step S4 to determine or select one of six shift modes I, II, III, IV, V and VI as indicated in the table of FIG. 10, based on the determined control error ΔNin, more specifically, depending upon one of six ranges of the control error amount ΔNin as indicated by hatched areas in the right-hand side portion of FIG. 10. The adjacent ranges of the error amount ΔNin overlap each other at their end portions, so as to avoid control instability when the corresponding adjacent shift modes (as indicated in FIG. 10) are repeatedly alternately selected under some conditions. If the currently detected control error ΔNin falls within the overlapping area of the two adjacent ranges, the currently selected shift mode remains to be selected. For example, if the detected control error ΔNin is reduced from 250 rpm (within the range corresponding to the shift mode II) to 140 rpm within the overlapping area between the ranges corresponding to the shift modes II and III while the shift mode II is selected, the currently selected shift mode is continuously selected. If the control error ΔNin is changed to a value falling within the overlapping area between the ranges corresponding to the shift modes II and III while the shift mode III is selected, the shift mode III is continuously used.

After the shift mode is selected or determined, step S5 is executed to determine whether the shift mode II is currently selected or not, and then step S6 is executed to determine whether the shift mode V is currently selected or not. If the shift mode II has been selected in step S4, an affirmative decision (YES) is obtained in step S5, and the control flow goes to step S7 in which the duty cycle Ds2 (%) of the second solenoid-operated valve 268 is calculated according to the following equation (4). If the shift mode V has been selected in step S4, an affirmative decision (YES) is obtained in step S6, and the control flow goes to step S8 in which the duty cycle Ds2 of the valve 268 is determined according to the following equation (5):

$$Ds2 = K1 \cdot \Delta Nin \quad (4)$$

$$Ds2 = -K2 \cdot \Delta Nin \quad (5)$$

where,
K1, K2: Constants

These two different equations (4) and (5) are used for determining the duty cycle Ds2, since the flow characteristic of the flow control valve 264 with respect to the duty cycle Ds2 differs between the shift-down and shift-up actions of the CVT 14.

The first and second solenoid-operated valves 266 and 268 are operated in step S12 (which will be described in detail), according to the ON-OFF states determined by the shift mode selected in step S4, and according to the duty cycle Ds2 determined in step S7 or S8 (for the second solenoid-operated valve 268 only). The duty cycling operation of the second solenoid-operated valve 268 in the shift modes II and V is effected by alternately turning on and off the solenoid coils in a predetermined cycle time Td, with an ON time Td·Ds2/100 and an OFF time Td·(1−Ds2/100). The duty cycle Ds2 of the valve 268 determined according to the equation (4) or (5) causes the flow rate Q of the flow control valve 264 to increase as a function of the amount of control error ΔNin, so that the flow rate Q is controlled so as to reduce the amount of control error ΔNin. Consequently, the actually detected speed Nin eventually coincides with the determined desired or target speed Nin* by controlling the flow control valve 264 in step S12, with the second solenoid-operated valve 268 operated with the duty cycle Ds2 determined in step S7 or S8. Thus, the feedback control of the flow control valve 264 for controlling the speed ratio "e" of the CVT 14 is effected.

Steps S7, S6 and S8 are followed by step S9 to determine or select one of eight hydraulic control modes A through H which are established by the third, fourth and fifth solenoid-operated valves 330, 346 and 392, as indicated in the table of FIG. 19. In this mode determining routine, the hydraulic control modes are selected when the respective operating conditions of the vehicle are satisfied.

When the shift lever 252 is operated to the NEUTRAL position "N", for example, the hydraulic control mode B is selected by turning OFF the third and fourth solenoid-operated valves 330 and 346 and turning ON the fifth solenoid-operated valve 392, as indicated in FIG. 19. In this mode B, the second line pressure Pl2 is lowered by a suitable amount for reducing the noise level of the transmission belt 44 of the CVT 14 while the shift lever 252 is in the NEUTRAL position "N". This pressure reduction contributes to improvement in the durability of the belt 44. The three solenoid-operated valves 330, 346 and 392 are placed in the same positions as indicated above, if the shift lever 252 is operated to the REVERSE position "R" while the vehicle forward running speed V is higher than a predetermined lower limit, e.g., around 7-10 km/h. Accordingly, the pilot pressure Psol5 is kept applied to the chamber 435 of the REVERSE INHIBIT valve 420, and the third line pressure Pl3 is applied to the chamber 436 of the REVERSE INHIBIT valve 420 through the port 256 of the shift lever valve 250. Therefore, the REVERSE INHIBIT valve 420 is operated to the reverse inhibit position (second position) for inhibiting the reversing device 16 from being placed in the reverse position, even if the shift lever 252 is operated to the REVERSE position "R" during the forward running of the vehicle.

When the throttle opening angle θth and the vehicle speed V fall within a predetermined range (stored in the ROM of the control device 460) for engagement of the lock-up clutch, the control device 460 selects the engaging mode of the lock-up clutch 36 as indicated in FIG. 15, namely, the hydraulic control mode C as indicated in FIG. 19. This hydraulic control mode C is established by turning ON the third solenoid-operated valve 330 and turning OFF the fourth and fifth solenoid-operated valves 346 and 392. As a result, the lock-up clutch 36 is engaged. If the vehicle speed V exceeds a predetermined limit, e.g., 100 km/h, in the hydraulic control mode C, the fifth solenoid-operated valve 392 is turned ON, whereby the mode C is replaced by the mode D, as indicated in FIG. 19. In this hydraulic control mode D, the second line pressure Pl2 is lowered by a suitable amount, for the purpose of preventing an excessive tension of the belt 44 due to the pressure rise in the hydraulic cylinder 56 by the centrifugal force.

If the throttle opening angle θth and the vehicle speed V with the shift lever 252 in the DRIVE position "D" falls within a predetermined range for releasing the lock-up clutch 36, or if the shift lever 252 is operated from the DRIVE position "D" to the NEUTRAL position "N", the first or second release mode of FIG. 15, namely, the hydraulic control mode A or H of FIG. 19 is established, with both of the third and fourth solenoid-operated valves 330, 346 being placed in the ON or OFF position. As a result, the lock-up clutch 36 is released. The hydraulic control mode H is selected when the torque transmitted by the CVT 14 is larger than usual, for example, when the vehicle is started, or when the shift lever 252 is moved from the DRIVE position "D" to the LOW position "L". In the mode H, the second line pressure Pl2 is raised by a suitable amount for increasing the tension of the belt 44.

In the situations where the reverse inhibit mode is not established and neither the position "N" nor position "P" is selected, a difference Nd between the input and output shafts 38, 58 of the reversing device 16 is calculated according to the following equation (6), if the shift lever 252 is placed in the REVERSE position "R". The difference Nd is calculated according to the following equation (7), if the shift lever 252 is placed in any one of the forward drive positions "D", "S" and "L".

$$Nd = |Nout - Ip \cdot Npc| \quad (6)$$

$$Nd = |Nout - Npc| \quad (7)$$

where,
Nout: rotating speed of output shaft 38 of CVT 14
Npc: rotating speed of carrier 60 of device 16
Ip: gear ratio of the device 16 when placed in the reverse position The value Npc is obtained according to the following equation (8) based on the vehicle speed V, and the value Ip is obtained according to the following equation (9), based on the values Nout and Npc when the REVERSE brake 70 is fully engaged:

$$Npc = C/V \quad (8)$$

$$Ip = Nout/Npc \quad (9)$$

where,
C: constant

The control device 460 determines whether the speed difference Nd calculated as described above is larger than a reference value $C_N$ stored in the ROM, or not. This reference value $C_N$, which is about 30 rpm, for example, is used to determine whether the FORWARD clutch 72 or REVERSE brake 70 has been fully engaged or not. If the control device 460 determines that the calculated difference Nd is not larger than the reference value $C_N$, this means that the clutch 72 or brake 70 has been fully engaged, and the back pressures of the accumulators 340, 342 are not controlled. If the difference Nd is larger than the reference value $C_N$, this means that the clutch 72 or brake 70 has not been fully engaged. In this case, the third solenoid-operated valve 330 is turned OFF, and the fourth solenoid-operated valve 346 is turned ON. Further, the fifth solenoid-operated valve 392 is turned ON or operated in the duty cycling manner (alternately turned ON and OFF). As a result, the hydraulic control mode F of FIG. 19 for effecting the accumulator back pressure control operation is established. In the case where the fifth solenoid-operated valve 392 is operated in the duty cycling manner, the duty cycle Ds5 is changed with time, according to a predetermined function stored in the ROM. In this hydraulic control mode F, the back pressure of the accumulator 342 or 340 is slowly changed to assure smooth engagement of the FORWARD clutch 72 or REVERSE brake 70, when the shift lever 252 is operated from the NEUTRAL position "N" to the DRIVE or REVERSE position "D", "R".

If the BRAKE switch 472 is ON and the vehicle speed V is lower than a predetermined reference value, namely, if the condition for releasing the lock-up clutch 36 has been satisfied, the control device 460 first selects the hydraulic control mode E for rapidly releasing the lock-up clutch 36, and then selects the hydraulic control mode G for normally releasing the clutch 36. Described more specifically, the third and fifth solenoid-operated valves 330 and 392 are turned OFF and the fourth solenoid-operated valve 346 is turned ON, to establish the mode E. After a suitable time has passed, the third solenoid-operated valve 330 is turned ON to establish the mode G.

For fail-safe operation of the lock-up clutch 36, the first or second release mode of FIG. 15 is selectively established so as to assure smooth and safe running of the vehicle. Normally, the predetermined one of the first and second release modes of FIG. 15 is selected when the throttle opening angle θth or the vehicle speed V is outside the predetermined range for engaging the clutch 36. If the lock-up clutch control valve 320 or the rapid lock-up clutch release valve 400 fails to normally function, the lock-up clutch 36 cannot be released and actually remains in the engaged position even though the predetermined one of the first and second release modes is selected. The control device 460 determines or detects the actual engagement of the clutch 36, when the difference (Ne − Nin) between the input and output speeds of the fluid coupling 12 is smaller than a predetermined reference value (e.g., 30 rpm). In this case, the control device 460 selects the other release mode to place the lock-up clutch 36 in the released position. The actual engagement of the clutch 36 can also be detected when the engine 10 stalls upon re-starting of the vehicle. The control device 460 also selects the other release mode in the case where the lock-up clutch 36 is actually released even though the engaging mode is selected. Namely, when the vehicle speed V or throttle opening angle θth falls within the predetermined range for engagement of the clutch 36, the engaging mode is selected with the third and fourth solenoid-operated valves 330, 346 turned ON and OFF, respectively, as long as the the valves 320 and 400 are normally functioning. If the valves 330, 346 fail to normally function, in this condition, the rapid release mode may be erroneously established with the valves 320, 400 placed in the OFF and ON positions, respectively. That is, the lock-up clutch 36 is actually released. The control device 460 detects the actual release of the clutch 36, when the difference (Ne − Nin) of the fluid coupling 12 is larger than a predetermined reference value. If the rapid release mode is continuously established, the working fluid may be overheated, since the fluid is discharged to the drain without passing through the oil cooler 339 in the rapid release mode. In view of this possibility, the control device 460 selects the other release mode so that the fluid is discharged to the drain through the oil cooler 339.

After the control device 460 selects one of the hydraulic control modes A–H of FIG. 19 in step S9 of the flow chart of FIGS. 20A and 20B, the control flow goes to step S10, in which the control device 460 determines whether the accumulator back pressure control mode C is selected, or not. If the mode C is selected, step S10 is followed by step S11 in which the duty cycle Ds5 of the fifth solenoid-operated valve 392 is determined. Step S11 is followed by step S12. If the mode C is not selected, the control flow goes directly to step S12. In this step S12, the control device 460 applies control signals to the first, second, third, fourth and fifth solenoid-operated valves 266, 268, 330, 346 and 392, so that the solenoid coils of these valves are placed in the appropriate ON or OFF state or energized in the controlled duty cycle (for the valves 268 and 392), depending upon the CVT shift mode selected in step S4 and the hydraulic control mode selected in step S9.

It will be understood from the foregoing description of the present embodiment of the invention that when the fourth and fifth solenoid-operated valves 346 and 392 are placed in the OFF and ON positions, respectively, the hydraulic control mode "B" of FIG. 19 is established for preventing the reversing device 16 from being placed in the reverse position even if the shift lever 252 is operated to the REVERSE position "R" while the vehicle is running in the forward direction. That is, the first relay valve 380 produces a first hydraulic signal (Psol5 equal to the fourth line pressure Pl4) for establishing the reverse inhibit position of the REVERSE INHIBIT valve 420, based on the OFF and ON states of the fourth and fifth solenoid-operated valves 346 and 392 (based on the absence of the pilot pressure Psol4 and the presence of the pilot pressure Psol5), respectively. By turning ON and OFF the fourth and fifth solenoid-operated valves 346 and 392, respectively, the power transmitting system is placed in the hydraulic control mode "G" in which the reversing device 16 is permitted to be placed in the reverse position when the shift lever 252 is operated to the REVERSE position while the vehicle is parked, for example. That is, the first relay valve 380 produces a second hydraulic signal (atmospheric pressure, in the present embodiment) for establishing the non-inhibit position of the REVERSE INHIBIT valve 420, based on the ON and OFF states of the valves 346 and 392 (absence and presence of the pilot pressures Psol4 and Psol5), respectively, namely, based on a combination of the operating states of the fourth and fifth solenoid-operated valves 346, 392 which is different from the combination for establishing the reverse inhibit position of the REVERSE INHIBIT valve 420. This arrangement permits the REVERSE INHIBIT valve 420 to be placed in the non-inhibit position by the first relay valve 380 to place the reversing device 16 in the reverse position, even in the event of a failure of first hydraulic signal generating means (346, 344) including the fourth solenoid-operated valve 346 (for producing first pilot pressure Psol4), or second hydraulic signal generating means (392, 394) including the fifth solenoid-operated valve 392 (for producing second pilot pressure Psol5), unless both of these first and second hydraulic pressure generating means are defective. For example, the REVERSE INHIBIT valve 420 can be brought to the non-inhibit position even if the fourth and fifth solenoid-operated valves 346 and 392 are both OFF or both ON, due to sticking of the valve spool of one of these valves 346, 392, upon generation of commands from the main control device 20 to turn ON and OFF the valves 346, 392, respectively, for selecting the hydraulic control mode "G" to place the reversing device 16 in the reverse position while the REVERSE INHIBIT valve 420 is placed in the reverse inhibit position in the hydraulic control mode "B" with the valves 346, 392 placed in the OFF and ON positions, respectively. In other words, the REVERSE INHIBIT valve 420 placed in the reverse inhibit position can be brought to the non-inhibit position when the fourth and fifth solenoid-operated valves 346, 392 for controlling the first relay valve 380 are placed in one of the four combinations of their operating states which is different from the combination used for establishing the reverse inhibit position of the REVERSE INHIBIT valve 420.

It will also be understood that the REVERSE INHIBIT valve 420 is brought to the reverse inhibit position when the pilot pressure Psol5 from the first relay valve 380 is applied to the chamber 435 while the third line pressure Pl3 from the shift lever valve 250 is applied to the chamber 436. In the present arrangement, the pilot pressure Psol5 can be used for other purposes, i.e., for reducing the second line pressure Pl2 as described above. In other words, the pilot pressure generating means which includes the fifth solenoid-operated valve 392 and the flow restrictor 394 can be used for establishing the hydraulic control modes "D" and "H" as well as the hydraulic control mode "B", thereby simplifying the present hydraulic control arrangement, as compared with an arrangement which uses respective solenoid-operated valves for the hydraulic control modes "B", "D" and "H".

Further, the present arrangement prevents the REVERSE INHIBIT valve 420 from being switched to the reverse inhibit position even if the pilot pressure Psol5 is applied to the chamber 435 of the valve 420 without the shift lever 252 operated to the reverse position, due to a failure of the fifth solenoid-operated control valve 392. The valve 420 cannot be brought to the reverse inhibit position, unless the third line pressure Pl3 from the port 256 of the shift lever valve 250 is applied to the valve 420.

While the present invention has been described in its presently preferred embodiment by reference to the accompanying drawings, it is to be understood that the invention may be otherwise embodied, without departing from the spirit of the invention.

For instance, while the hydraulic control mode "B" is established while the fourth and fifth solenoid-operated valves 346, 392 are placed in the OFF and ON positions, respectively, the other three combinations (ON and ON; ON and OFF; and OFF and OFF) of the operating states of the valves 346, 392 may be used to establish the hydraulic control mode "B" for placing the REVERSE INHIBIT valve 420 in the reverse inhibit position. In essence, the fourth and fifth solenoid-operated valves 346, 392, first relay valve 380, and REVERSE INHIBIT valve 420 should be adapted such that the inhibit position of the REVERSE INHIBIT valve 420 can be replaced by the non-inhibit position when at least one of the operating conditions of the two valves 346, 392 is different from the corresponding one of the operating conditions of the valves 346, 392 used for establishing the inhibit position.

While the four modes of FIG. 15 are applied to the lock-up clutch 36 of the fluid coupling 12 in the illustrated embodiment, similar modes are applicable to any other hydraulically operated clutch used in a power transmitting system of a motor vehicle.

In the illustrated embodiment, the first and second line pressures Pl1 and Pl2 are used for operating the driving and driven side hydraulic cylinders 54, 56. However, it is possible that a single line pressure is always applied to the driven side cylinder for adjusting the tension of the belt 44, while the fluid of that line pressure is fed and discharged into and out of the driving side cylinder through a shift control valve device, for changing the speed ratio of the CVT 14.

While the belt-and-pulley type CVT 14 is used in the illustrated embodiment, the CVT 14 may be replaced by a continuously variable transmission of a traction type which uses rollers for transmitting power from the engine 10 to the reversing device 16.

In the illustrated embodiment, the THROTTLE pressure Pth produced by the throttle sensing valve 180 which detects the throttle opening angle θth is used as a pressure representative of the currently required output of the engine 10. Where the hydraulic control apparatus of the invention is used for a vehicle having a diesel engine without a throttle valve, the pressure Pth may be replaced by a pressure which represents an amount corresponding to an amount of operation of an accelerator pedal of the vehicle. In this case, the cam 184 is mechanically linked with the accelerator pedal, so that the cam 184 is rotated as the pedal is depressed.

While the illustrated embodiment is adapted such that the speed ratio "e" of the CVT 14 is controlled so that the actually detected speed Nin of the input shaft 30 coincides with a determined desired or target speed Nin*, it is possible to control the speed ratio "e" so that the actually detected speed ratio "e" coincides with a determined desired ratio "e*", since the speed ratio "e" is equal to Nout/Nin.

The reversing device 16 which is located between the output shaft 38 of the CVT 14 and the intermediate gear device 18 in the illustrated embodiment, may be disposed between the fluid coupling 12 and the input shaft 30 of the CVT 14. The reversing device 16 may have two or more forward drive positions in addition to the reverse position.

The fluid coupling 12 may be replaced by other couplings such as torque converter, electromagnetic clutch and wet-type clutch.

It is to be understood that the present invention may be embodied with various other changes, modifications and improvements, which may occur to those skilled in the art, without departing from the scope of the invention defined in the following claims.

What is claimed is:

1. A hydraulic control apparatus for controlling a hydraulically operated power transmitting system for a motor vehicle, wherein power is transmitted from an engine of the vehicle to a drive wheel of the vehicle through a reversing gear mechanism having a reverse position which is established by a hydraulic actuator in response to an operation of a shift lever to a reverse position, by applying a hydraulic pressure to the actuator, said hydraulic control apparatus comprising:

a reverse inhibit valve disposed in a hydraulic line leading to said hydraulic actuator, and having a reverse inhibit position for inhibiting said reversing gear mechanism from being placed in the reverse position and a non-inhibit position for permitting said mechanism to be placed in the reverse position;

first pilot pressure generating means including a solenoid operated valve which is turned on and off for producing a first pilot pressure in one of on and off states thereof;

second pilot pressure generating means including a solenoid-operated valve which is turned on and off for producing a second pilot pressure in one of on and off states thereof; and a relay valve for applying a first hydraulic signal to said reverse inhibit valve for placing the reverse inhibit valve in said reverse inhibit position, when one of four combinations of on-off operating states of said solenoid-operated valves of said first and second pilot pressure generating means is established, and for applying a second hydraulic signal to said reverse inhibit valve for placing the reverse inhibit valve in said non-inhibit position, when any one of the other of said four combinations of on-off operating states is established.

2. A hydraulic control apparatus according to claim 1, wherein said hydraulically operated power transmitting system includes a continuously variable transmission whose speed ratio is continuously variable, and a reversing device as said reversing gear mechanism connected in series with said continuously variable transmission, said reversing device being operated by said hydraulic actuator to a forward position in response to an operation of said shift lever to a forward drive position, and to said reverse position in response to the operation of the shift lever to said reverse position.

3. A hydraulic control apparatus according to claim 1, further comprising a shift lever valve operatively connected to said shift lever and operable to apply a hydraulic pressure to a first hydraulic actuator to establish said forward position of said reversing device when said shift lever is operated to said forward drive position, and apply a hydraulic pressure to a second hydraulic actuator to establish said reverse position of said reversing device when said shift lever is operated to said reverse position.

4. A hydraulic control apparatus according to claim 3, wherein said reverse inhibit valve is disposed in a hydraulic line between said shift lever valve and said second hydraulic actuator and has: a valve spool movable between said reverse inhibit position and said non-inhibit position; a chamber partially defined by one end of said valve spool and receiving one of said first and second hydraulic signals from said relay valve, to produce a thrust acting on said valve spool in a first direction toward said reverse inhibit position; a spring for biasing said valve spool in a second direction toward said non-inhibit position; a chamber partially defined by the other end of said valve spool and receiving a pressure in said second hydraulic actuator, to produce a thrust acting on said valve spool in said second direction; a plunger held in abutting contact with said other end of said valve spool and having a smaller diameter than said valve spool; and a chamber partially defined by one end of said plunger and receiving a pressure produced by said shift lever valve, to produce a thrust acting on said valve spool in said second direction, said valve spool being moved to said reverse inhibit position when said first hydraulic signal is applied to said chamber partially defined by said one end of said valve spool.

5. A hydraulic control apparatus according to claim 1, wherein said relay valve includes a valve spool movable between a first and a second position by said first pilot pressure produced by said first pilot pressure generating means, such that said second pilot pressure produced by said second pilot pressure generating means is applied to said reverse inhibit valve as said first hydraulic signal when said valve spool of said relay valve is placed in said first position, and such that said second pilot pressure is blocked by said valve spool of said relay valve and an atmospheric pressure is applied to said reverse inhibit valve as said second hydraulic signal when said valve spool of said relay valve is placed in said second position.

6. A hydraulic control apparatus according to claim 1, wherein each of said first and second pilot pressure generating means further includes a flow restrictor to which said solenoid-operated valve is connected to a pressure line through said flow restrictor, said first and second pilot pressure generating means producing said first and second pilot pressures by changing a pressure in said pressure line downstream of the flow restrictors, in response to on-off operations of the solenoid-operated valves, respectively.

7. A hydraulic control apparatus according to claim 6, further comprising an electronic control device which operates to determine whether said shift lever is operated to said reverse position while said vehicle is running in a forward direction, said solenoid-operated valves of said first and second pilot pressure generating means being controlled by said control device.

8. A hydraulic control apparatus according to claim 7, wherein said electronic control device commands said solenoid-operated valves so that said relay valve produces said first hydraulic signal to place said reverse inhibit valve in said reverse inhibit position when said electronic control device determines that said shift lever is operated to said reverse position while said vehicle is running in said forward direction.

9. A hydraulic control apparatus according to claim 1, further comprising a shift lever valve operatively connected to said shift lever and operable to apply a hydraulic pressure to said hydraulic actuator to establish said reverse position of said reversing gear mechanism when said shift lever is operated to said reverse position, and wherein said reverse inhibit valve is disposed in a hydraulic line between said shift lever valve and said hydraulic actuator, and is operated to said reverse inhibit position when a hydraulic pressure produced by said shift lever valve and said first hydraulic signal produced by said relay valve are applied to said reverse inhibit valve, and to said non-inhibit position when at least one of said hydraulic pressure and first hydraulic signal produced by said shift lever valve and relay valve is not applied to said reverse inhibit valve.

10. A hydraulic control apparatus for controlling a hydraulically operated power transmitting system for a motor vehicle, wherein power is transmitted from an engine of the vehicle to a drive wheel of the vehicle through a reversing gear mechanism having a reverse position which is established by a hydraulic actuator in response to an operation of a shift lever to a reverse position, said hydraulic control apparatus comprising:

a shift lever valve operatively connected to said shift lever and operable to apply a hydraulic pressure to said hydraulic actuator to establish said reverse position of said reversing gear mechanism when said shift lever is operated to said reverse position;

hydraulic signal generating means for producing a hydraulic signal for inhibiting said reversing gear mechanism from being placed in said reverse position while said vehicle is running in a forward direction; and a reverse inhibit valve disposed in a hydraulic line leading to said hydraulic actuator, said reverse inhibit valve being operated to a reverse inhibit position for inhibiting said reversing gear mechanism from being placed in the reverse position in response to said hydraulic pressure and said hydraulic signal being both concurrently applied to said reverse inhibit valve.

11. A hydraulic control apparatus according to claim 10, wherein said hydraulically operated power transmitting system includes a continuously variable transmission whose speed ratio is continuously variable, and a reversing device as said reversing gear mechanism connected in series with said continuously variable transmission, said reversing device being operated by said hydraulic actuator to a forward position in response to an operation of said shift lever to a forward drive position, and to said reverse position in response to the operation of the shift lever to said reverse position.

12. A hydraulic control apparatus according to claim 10, wherein said shift lever valve is operable to apply a hydraulic pressure to a first hydraulic actuator to establish a forward position of said reversing device when said shift lever is operated to a forward drive position, and apply a hydraulic pressure to a second hydraulic actuator to establish said reverse position of said reversing device when said shift lever is operated to said reverse position.

13. A hydraulic control apparatus according to claim 10, wherein said reverse inhibit valve has: a spool movable between said reverse inhibit position and said non-inhibit position; a chamber partially defined by one end of said valve spool and receiving said hydraulic signal from said hydraulic signal generating means, to produce a first thrust acting on said valve spool in a first direction toward said reverse inhibit position; and a chamber partially defined by said valve spool and receiving said hydraulic pressure from said shift lever valve, to produce a second thrust acting on said valve spool in said first direction, said valve spool being moved to said reverse inhibit position when both of said first and second thrusts act on said valve spool.

14. A hydraulic control apparatus according to claim 13, wherein said reverse inhibit valve further has; a spring for biasing said valve spool in a second direction toward said non-inhibit position; a chamber partially defined by said valve spool and receiving a pressure in said hydraulic actuator, to produce a third thrust acting on said valve spool in said second direction; a plunger held in abutting contact with the other end of said valve spool and having a smaller diameter than said valve spool; and a chamber partially defined by one end of said plunger and receiving the pressure produced by said shift lever valve, to produce a fourth thrust acting on said valve spool in said second direction, said valve spool being moved to said reverse inhibit position when a sum of said first and second thrusts exceeds a sum of said third and fourth thrusts.

15. A hydraulic control apparatus according to claim 10, wherein said hydraulic signal generating means comprises first pilot pressure generating means for producing a first pilot pressure, second pilot pressure generating means for producing a second pilot pressure, and a relay valve for producing said hydraulic signal to be applied to said reverse inhibit valve, when one of combinations of operating states of said first and second pilot pressure generating means is established.

16. A hydraulic control apparatus according to claim 15, wherein each of said first and second pilot pressure generating means includes a flow restrictor and a solenoid-operated valve connected to a pressure line through said flow restrictor, said first and second pilot pressure generating means producing said first and second pilot pressures by changing a pressure in said pressure line downstream of the flow restrictors, in response to opening and closing operations of the solenoid-operated valves, respectively.

17. A hydraulic control apparatus according to claim 16, further comprising an electronic control device which operates to determine whether said shift lever is operated to said reverse position while said vehicle is running in a forward direction, said solenoid-operated valves of said first and second pilot pressure generating means being controlled by said control device.

18. A hydraulic control apparatus according to claim 17, wherein said electronic control device commands said solenoid-operated valves so that said relay valve produces said first hydraulic signal to place said reverse inhibit valve in said reverse inhibit position when said electronic control device determines that said shift lever is operated to said reverse position while said vehicle is running in said forward direction.

19. The hydraulic control apparatus of claim 10, wherein said reverse inhibit valve is operated to a non-inhibit position in response to said hydraulic pressure not being applied to said reverse inhibit valve.

* * * * *